United States Patent
Kumar et al.

(10) Patent No.: US 12,100,082 B2
(45) Date of Patent: Sep. 24, 2024

(54) SYSTEM AND METHOD OF CROSS-MODULATED DENSE LOCAL FUSION FOR FEW-SHOT IMAGE GENERATION

(71) Applicant: Mohamed bin Zayed University of Artificial Intelligence, Abu Dhabi (AE)

(72) Inventors: Amandeep Kumar, Abu Dhabi (AE); Ankan Kumar Bhunia, Abu Dhabi (AE); Hisham Cholakkal, Abu Dhabi (AE); Sanath Narayan, Abu Dhabi (AE); Rao Muhammad Anwer, Abu Dhabi (AE); Fahad Khan, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 153 days.

(21) Appl. No.: 17/983,952

(22) Filed: Nov. 9, 2022

(65) Prior Publication Data
US 2024/0161360 A1    May 16, 2024

(51) Int. Cl.
*G06T 11/60*    (2006.01)
*G06T 9/00*     (2006.01)
(Continued)

(52) U.S. Cl.
CPC .............. *G06T 11/60* (2013.01); *G06T 9/00* (2013.01); *G06V 10/44* (2022.01); *G06V 10/761* (2022.01);
(Continued)

(58) Field of Classification Search
CPC ....... G06T 11/60; G06T 9/00; G06T 2200/24; G06V 10/44; G06V 10/761; G06V 10/806; G06V 10/82
See application file for complete search history.

(56) References Cited

U.S. PATENT DOCUMENTS

2021/0232850 A1    7/2021  Bui et al.
2022/0076374 A1*   3/2022  Li .......................... G06T 3/10
(Continued)

FOREIGN PATENT DOCUMENTS

CN    109685116 A    4/2019
CN    113112401 A    7/2021

OTHER PUBLICATIONS

Zheng Gu, Wenbin Li, Jing Huo, Lei Wang, Yang Gao; Proceedings of the IEEE/CVF International Conference on Computer Vision (ICCV), 2021, pp. 8463-8471 (Year: 2021).*

(Continued)

*Primary Examiner* — William A Beutel
(74) *Attorney, Agent, or Firm* — Oblon, McClelland, Maier & Neustadt, L.L.P.

(57) ABSTRACT

An apparatus, computer readable storage medium and method of generating a diverse set of images from few-shot images, includes a parameter input receiving values for control parameters to control an extent to which each reference image impacts a newly generated image. The apparatus involves an image generation deep learning network for generating an image for each of the values for the control parameters. The deep learning network has an encoder, a transformer-based fusion block, and a decoder. The transformer-based fusion block includes a mapping network that computes meta-weights from features extracted from the reference images and the control parameters, and a cross-attention block to generate modulation weights based on the meta-weights. An output displays high-quality and diverse images generated based on the values for the control parameter.

18 Claims, 18 Drawing Sheets

(51) Int. Cl.
*G06V 10/44* (2022.01)
*G06V 10/74* (2022.01)
*G06V 10/80* (2022.01)
*G06V 10/82* (2022.01)

(52) U.S. Cl.
CPC ............ *G06V 10/806* (2022.01); *G06V 10/82* (2022.01); *G06T 2200/24* (2013.01)

(56) References Cited

U.S. PATENT DOCUMENTS

2023/0281884 A1\* 9/2023 Li .................... G06T 11/001
 715/812
2024/0112448 A1\* 4/2024 Arief ................ G06V 10/764

OTHER PUBLICATIONS

Hong, Yan, et al. "F2gan: Fusing-and-filling gan for few-shot image generation." Proceedings of the 28th ACM international conference on multimedia. 2020 (Year: 2020).\*

Karras, et al. ; Analyzing and Improving the Image Quality of StyleGAN ; NVIDIA ; Mar. 23, 2020 ; 21 Pages.

Zhu, et al. ; One-Shot Texture Retrieval with Global Context Metric ; University of Science and Technology of China ; May 16, 2019.

\* cited by examiner

SYSTEM AND METHOD OF CROSS-MODULATED DENSE LOCAL FUSION FOR FEW-SHOT IMAGE GENERATION

STATEMENT OF PRIOR DISCLOSURE BY INVENTOR(S)

Aspects of the present disclosure were presented in a Vision Conference (ECCV-22) Oct. 23-27, 2022 in Tel Aviv.

BACKGROUND

Technical Field

The present disclosure is directed to a few-shot image generation method and system, and in particular, a parameterized controlled fusion scheme to ensure diverse image generation and to provide control over image generation.

Description of the Related Art

Few-shot (FS) image generation strives to generate a diverse set of images for a novel object category given only a few reference images of the respective class. However, FS image generation is challenging since it is laborious to manually collect a large number of images for downstream tasks. On the other hand, FS image generation is practical for downstream tasks such as classification and detection. Existing FS image generation approaches can be broadly divided into three categories based on whether they use a transformation, optimization or fusion approach. See Antoniou, A., Storkey, A., Edwards, H.: Data augmentation generative adversarial networks. In: arXiv preprint arXiv:1711.04340 (2017); Clouâre, L., Demers, M.: Figr: Few-shot image generation with reptile. In: arXiv preprint arXiv:1901.02199 (2019); Liang, W., Liu, Z., Liu, C.: Dawson: A domain adaptive few shot generation framework. In: arXiv preprint arXiv:2001.00576 (2020); Hong, Y., Niu, L., Zhang, J., Zhang, L.: Matchinggan: Matching-based few-shot image generation. In: ICME (2020); Hong, Y., Niu, L., Zhang, J., Zhao, W., Fu, C., Zhang, L.: F2gan: Fusing-and-filling gan for few-shot image generation. In: ACM MM (2020); and Gu, Z., Li, W., Huo, J., Wang, L., Gao, Y.: Lofgan: Fusing local representations for few-shot image generation. In: CVPR (2021), each incorporated herein by reference in their entirety. The transformation-based approach learns to perform generalized data augmentations to generate intra-class images from a single conditional image. On the other hand, optimization-based approaches typically utilize meta-learning techniques to adapt to a different image generation task by optimizing on a few reference images from the novel domain. These two paradigms are better suited for a simple image generation task. Unlike these two paradigms, fusion-based approaches first aggregate latent features of reference images and then employ a decoder to generate same class images from these aggregated features.

Recently, generative models, commonly referred to as generative adversarial networks (GAN), have been used for image generation, among other tasks. The ability of generative models to fit to a variety of data distributions has enabled great strides of advancement in tasks, such as image generation, image-to-image translation, image editing and so on. See Goodfellow, I., Pouget-Abadie, J., Mirza, M., Xu, B., Warde-Farley, D., Ozair, S., Courville, A., Bengio, Y.: Generative adversarial nets. In: NeurIPS (2014); Kingma, D. P., Welling, M.: Auto-encoding variational bayes. In: arXiv preprint arXiv:1312.6114 (2013); Karras, T., Aila, T., Lathe, S., Lehtinen, J.: Progressive growing of gans for improved quality, stability, and variation. In: arXiv preprint arXiv:1710.10196 (2017); Karras, T., Lathe, S., Aila, T.: A style-based generator architecture for generative adversarial networks. In: CVPR (2019); Brock, A., Donahue, J., Simonyan, K.: Large scale gan training for high fidelity natural image synthesis. In: arXiv preprint arXiv:1809.11096 (2018); Vandat, A., Kautz, J.: NVAE: A deep hierarchical variational autoencoder. In: NeurIPS (2020); Zhu, J. Y., Park, T., Isola, P., Efros, A. A.: Unpaired image-to-image translation using cycle-consistent adversarial networks. In: ICCV (2017); Choi, Y., Choi, M., Kim, M., Ha, J. W., Kim, S., Choo, J.: Stargan: Unified generative adversarial networks for multi-domain image-to-image translation. In: CVPR (2018); Abdal, R., Qin, Y., Wonka, P.: Image2stylegan: How to embed images into the stylegan latent space? In: ICCV (2019); Zhu, J., Shen, Y., Zhao, D., Zhou, B.: In-domain gan inversion for real image editing. In: ECCV (2020), each incorporated herein by reference in their entirety. Despite their success, these generative models typically require large amount of data to train and avoid overfitting. In order to alleviate this issue, in the context of generative adversarial networks (GANs), transfer learning (generative adaptation) has been explored as an alternative to training from scratch. Approaches that rely on transfer learning start from a source model that is pretrained on a large dataset and adapt it to a target domain with limited samples. This is achieved by either performing only small modifications to the network parameters with an aim to preserve most of the information content, or by employing data augmentation techniques to synthetically increase the limited data. See Wang, Y., Wu, C., Herranz, L., van de Weijer, J., Gonzalez-Garcia, A., Raducanu, B.: Transferring gans: generating images from limited data. In: ECCV (2018); Wang, Y., Gonzalez-Garcia, A., Berga, D., Herranz, L., Khan, F. S., Weijer, J.v.d.: Minegan: effective knowledge transfer from gans to target domains with few images. In: CVPR (2020); Robb, E., Chu, W. S., Kumar, A., Huang, J. B.: Few-shot adaptation of generative adversarial networks. In: arXiv preprint arXiv:2010.11943 (2020); Noguchi, A., Harada, T.: Image generation from small datasets via batch statistics adaptation. In: ICCV (2019); Li, Y., Zhang, R., Lu, J., Shechtman, E.: Few-shot image generation with elastic weight consolidation. In: arXiv preprint arXiv:2012.02780 (2020); Zhao, M., Cong, Y., Carin, L.: On leveraging pretrained gans for generation with limited data. In: ICML (2020); Zhao, S., Liu, Z., Lin, J., Zhu, J. Y., Han, S.: Differentiable augmentation for data-efficient gan training. In: NeurIPS (2020); and Karras, T., Aittala, M., Hellsten, J., Lathe, S., Lehtinen, J., Aila, T.: Training generative adversarial networks with limited data. In: NeurIPS (2020), each incorporated herein by reference in their entirety. While achieving promising results, these transfer learning (generative adaptation) approaches require an initial model pretrained on a disjoint source domain with large data.

Unlike the above transfer learning (generative adaptation) approaches for image generation, few-shot image generation approaches strive to generate images from disjoint novel categories from the same domain as in the training. See Clouare et al.; Liang et al.; Bartunov, S., Vetrov, D.: Few-shot generative modelling with generative matching networks. In: ICAIS (2018); Hong et al.: Matchinggan: Matching-based few-shot image generation; and Gu et al., each incorporated herein by reference in their entirety. The works of Clouare et al. and Liang et al. employ an optimization-based paradigm by combining meta-learning with adversarial learning. See Clouare et al.; Liang et al.; and Finn, C., Abbeel, P., Levine, S.: Model-agnostic meta-learning for fast adaptation of deep networks. In: ICML (2017), each incorporated herein by reference in their entirety. Differently, attempt to generalize a matching network from few-shot image classification task to few-shot image generation. See Bartunov, et al.; and Hong et al.; Matchinggan: Matching-based few-shot image generation. The work of Hong et al. extends the MatchingGAN approach, Matchinggan: Matching-based few-shot image generation, by incorporating a non-local fusion module to fuse high-level image features for generating images while employing an image-level reconstruction loss. Furthermore, the recent work of Gu et al. utilizes a random feature selection and replacement procedure to fuse information among few-shot sample inputs while using reconstruction loss at a local-level on the image semantics.

Recently, fusion-based approaches have been shown to achieve promising results for FS image generation. Among the fusion-based approaches, a few methods employ weighted aggregation of images, belonging to the same object category, at the global feature map level. See Hong, et al.: Matchinggan: Matching-based few-shot image generation; and Hong, et al.: F2gan: Fusing-and-filling gan for few-shot image generation. In: ACM MM (2020).

However, fusion at the global feature map level introduces semantic misalignment between different images as well as limited diversity in the generated images since local semantics are fused with their corresponding relative positions being fixed. Distinct from these approaches, the fusion approach of LoFGAN introduces a local fusion module, which performs a feature fusion via selection and replacement of features in the base image, based on their similarity to local patch features in reference images. Moreover, a local image-based reconstruction loss that aligns semantic patches is employed for training the framework. However, LoFGAN struggles to generate diverse images and in most cases the output images substantially resemble the base image due to the retention of a certain percentage of features from the input base image during the random feature selection and replacement procedure.

Accordingly, it is one object of the present disclosure to provide a solution to the disadvantages of conventional fusion approaches by generating high-quality yet diverse images.

SUMMARY

An aspect of the present disclosure is an apparatus that generates a diverse set of new images from K few-shot original images, where K is a natural number, that can include a graphical user interface having an image input for receiving the K few-shot original images, including K−1 reference images and a base image; a parameter input receiving a plurality of values for at least one control parameter for a fusion block, the at least one control parameter to control an extent to which each reference image impacts a newly generated image; processor circuitry configured with an image generation deep learning network for generating an image for each of the plurality of values for the at least one control parameter, the deep learning network having an encoder, a transformer-based fusion block, and a decoder. The transformer-based fusion block having an input for receiving the least one control parameter, a mapping network that computes meta-weights from features extracted from the reference images and the at least one control parameter, and a cross-attention block to generate modulation weights based on the meta-weights; and an output that outputs a list of the generated images based on the plurality of values for the at least one control parameter.

A further aspect is a non-transitory computer readable storage medium storing program instructions, which when executed by processor circuitry performs steps in a method of generating a diverse set of new images from K few-shot original images, where K is a natural number, the method can include receiving the K few-shot original images, including K−1 reference images and a base image; receiving a plurality of values for at least one control parameter for a fusion block, the at least one control parameter to control an extent to which each reference image impacts a newly generated image; generating, via an image generation deep learning network, an image for each of the plurality of values for the at least one control parameter, the deep learning network having an encoder, a transformer-based fusion block, and a decoder. The method further including receiving the least one control parameter; computing, via a mapping network, meta-weights from features extracted from the reference images and the at least one control parameter; and generating, via a cross-attention block, modulation weights based on the meta-weights; and outputting a list of the generated images based on the plurality of values for the at least one control parameter.

A further aspect is a method, executed by processor circuitry, of generating a diverse set of new images from K few-shot original images, where K is a natural number, the method can include receiving the K few-shot original images, including K−1 reference images and a base image; receiving a plurality of values for at least one control parameter for a fusion block, the at least one control parameter to control an extent to which each reference image impacts a newly generated image; generating, via an image generation deep learning network, an image for each of the plurality of values for the at least one control parameter, the deep learning network having an encoder, a transformer-based fusion block, and a decoder. The method further including receiving the least one control parameter; computing, via a mapping network, meta-weights from features extracted from the reference images and the at least one control parameter; and generating, via a cross-attention block, modulation weights based on the meta-weights; and outputting a list of the generated images based on the plurality of values for the at least one control parameter.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
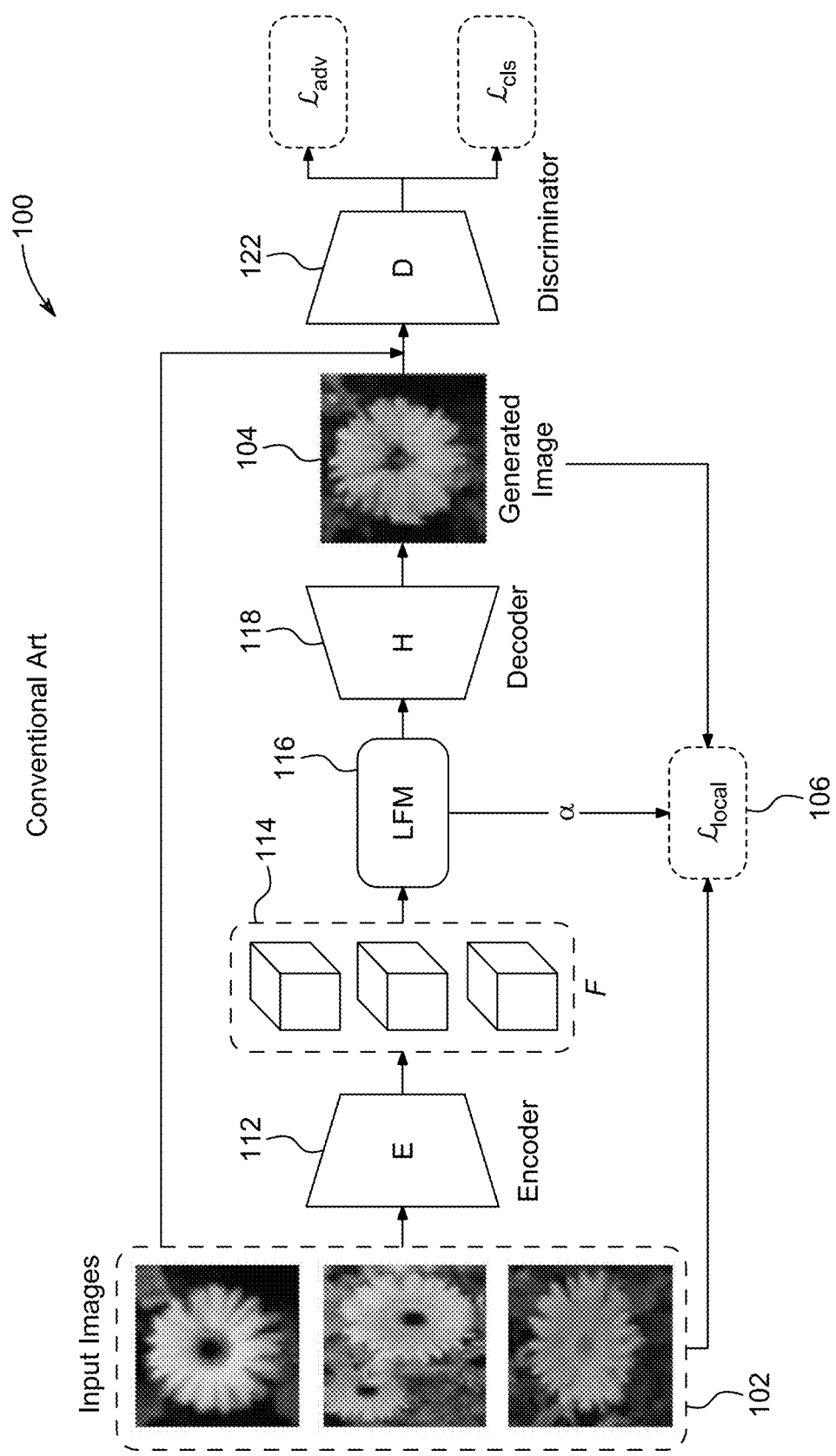
FIG. 1 is a diagram of a conventional machine learning architecture for FS image generation.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Stock photography is a term that has become widely used in the world of digital marketing. The demand for better quality marketing materials has increased tremendously leading to growth in the industry that supplies digital marketing materials. The industry of stock photography creates and sells imagery in the form of photos, illustrations, or videos and that can be purchased through various licensing models. Among the types of stock photography, microstock photography offers non-exclusive use of imagery as it is sold at great volume for multiple customers.

Often companies desire custom imagery for a particular marketing campaign. Stock photography provides an endless resource of versatile images. Stock photos can fill a specific gap in a marketing campaign and can also serve as an inspirational tool in a creative process. A stock photography agency can help with obtaining the optimum photo shot. However, the available optimum photo shot may still not meet the needs of the marketing campaign. For example, various colors in the image may not be a good match for the impression that the campaign desires to express, or may not be a good match for the other portions of a marketing tool. There is a need for a system and method that can generate a variety of images from a stock photo to give the marketing campaign a wider choice.

Disclosed embodiments offer a tool for generating a wider variety of stock photos. Disclosed embodiments relate to a few-shot image generation approach that densely aggregates features from all relevant local regions of reference images at a global-receptive field along with a controllable mechanism for modulating the image features by utilizing meta-weights computed from the input reference image features. See Vaswani, A., Shazeer, N., Parmar, N., Uszkoreit, J., Jones, L., Gomez, A. N., Kaiser, L., Polosukhin, I.: Attention is all you need. In: NeurIPS (2017); and Dosovitskiy, A., Beyer, L., Kolesnikov, A., Weissenborn, D., Zhai, X., Unterthiner, T., Dehghani, M., Minderer, M., Heigold, G., Gelly, S., et al.: An image is worth 16×16 words: Transformers for image recognition at scale. In: arXiv preprint arXiv: 2010.11929 (2020), each incorporated herein by reference in their entirety. As a result, this leads to high-quality yet diverse image generation in the challenging few-shot setting.

For purposes of this disclosure, high-quality imagery includes characteristics of sharpness, contrast, vibrance, and saturation. A high-quality image is clear and sharp, as opposed to blurry and noisy. A high-quality image shows darks that appear close to black, and light areas that appear close to white, A high-quality image shows colors as vivid, as opposed to dull. A high-quality image shows vibrant colors that magnify the intensity of the color. The disclosed approach generates images of quality that matches the quality of the based and reference images.

For purposes of this disclosure, the term few-shot generally means that about five, or at most about ten images of an object class are available. In contrast, images taken using a burst image mode can result in fifty to one hundred images of an object class being available.

The disclosed approach is not limited to small image size. Example implementations utilize datasets with 128×128 pixels and 64×64 pixels. Few-shot images of higher size are limited only by the available computing power for performing image generation. The disclosed approach can be implemented for porting to an AI workstation (e.g., a Lambda workstation or equivalent) or cloud service for machine learning.

FIG. 1 is a diagram of the LoFGAN framework having the local fusion module. The generator is a conditional one that contains an encoder E (112), a decoder H (116), and a local fusion module LFM (114). The input images $X=\{x_1, \ldots, x_k\}$ (102) are first fed into the encoder E (112) which extracts deep features F=E(X) (114). Then, the LFM module (116) takes F (114) and a random coefficient vector a as inputs and produces a semantically aligned fused feature $\hat{F}$=LFM(F, α). After that, the decoder H (118) decodes the feature back to the image and obtains the generated image $\hat{x}$=H($\hat{F}$) (104). The real images X (102) and generated image $\hat{x}$ (104) are fed into the discriminator D (122) for adversarial training.

A local reconstruction loss ζ (106) reproduces the feature-level local fusion procedure at the image-level. Specifically, the positions for every selected base and reference local representations in $\varphi_{base}$ and $\Phi_{ref}$ are recorded, and each position of the selected feature is mapped back to the original image size to get a roughly fused image LFM (X, α). After that, $\hat{x}$ is constrained by the reconstruction loss (106).

While achieving encouraging performance on multiple benchmarks, LoFGAN employs a heuristic-based random feature selection and replacement procedure that leads to inconsistent patterns and artifacts in the generated images. In addition, such a random feature selection and replacement procedure only makes use of the most similar local patches, thereby ignoring other potentially relevant regions in a reference image.

Figure 2A:
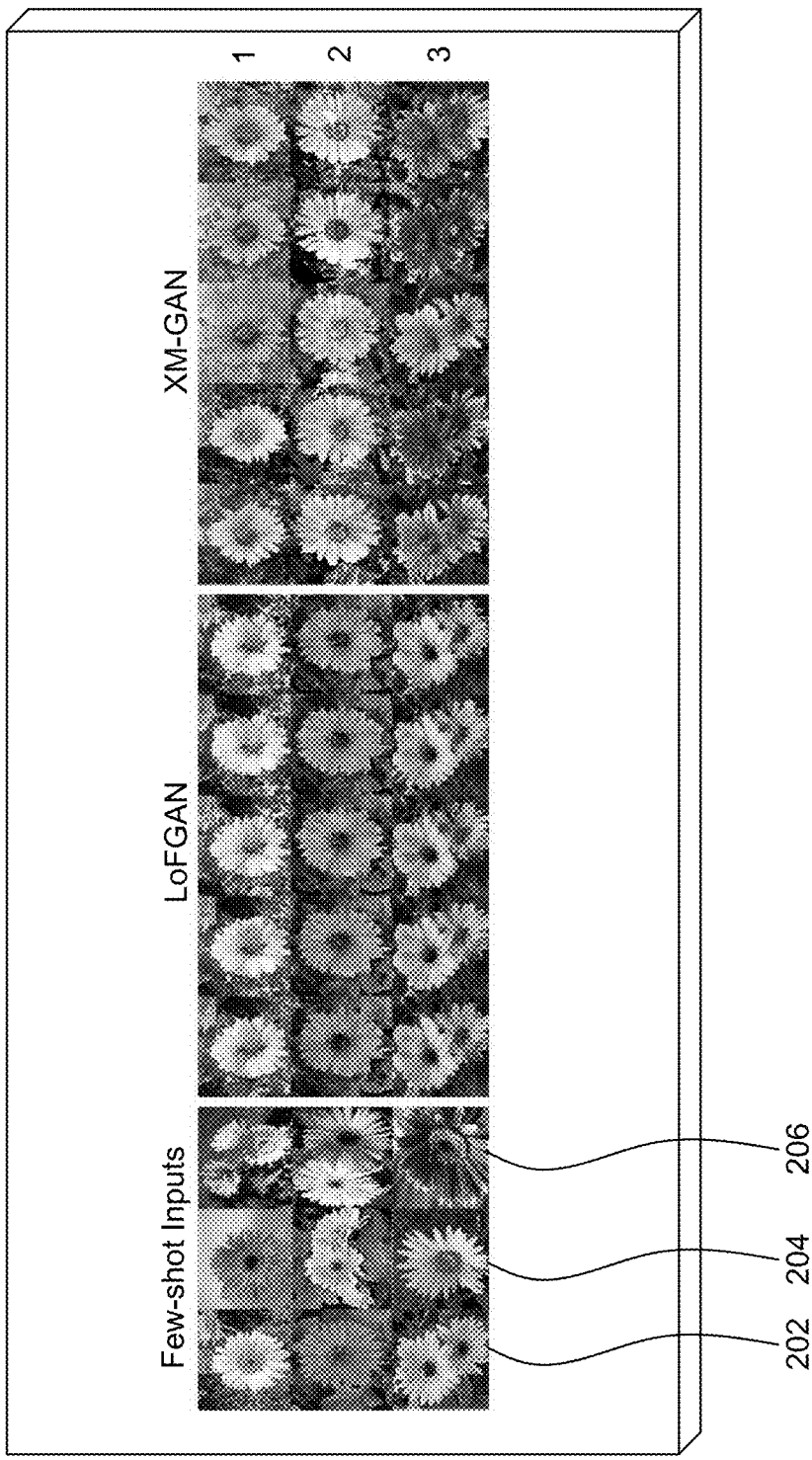
FIGS. 2A, 2B, 2C illustrate a comparison of generated images between the LoFGAN approach and the disclosed XM-GAN on example few-shot inputs from Flowers, VGG-Face, and Animal Faces datasets.
Figure 2B:
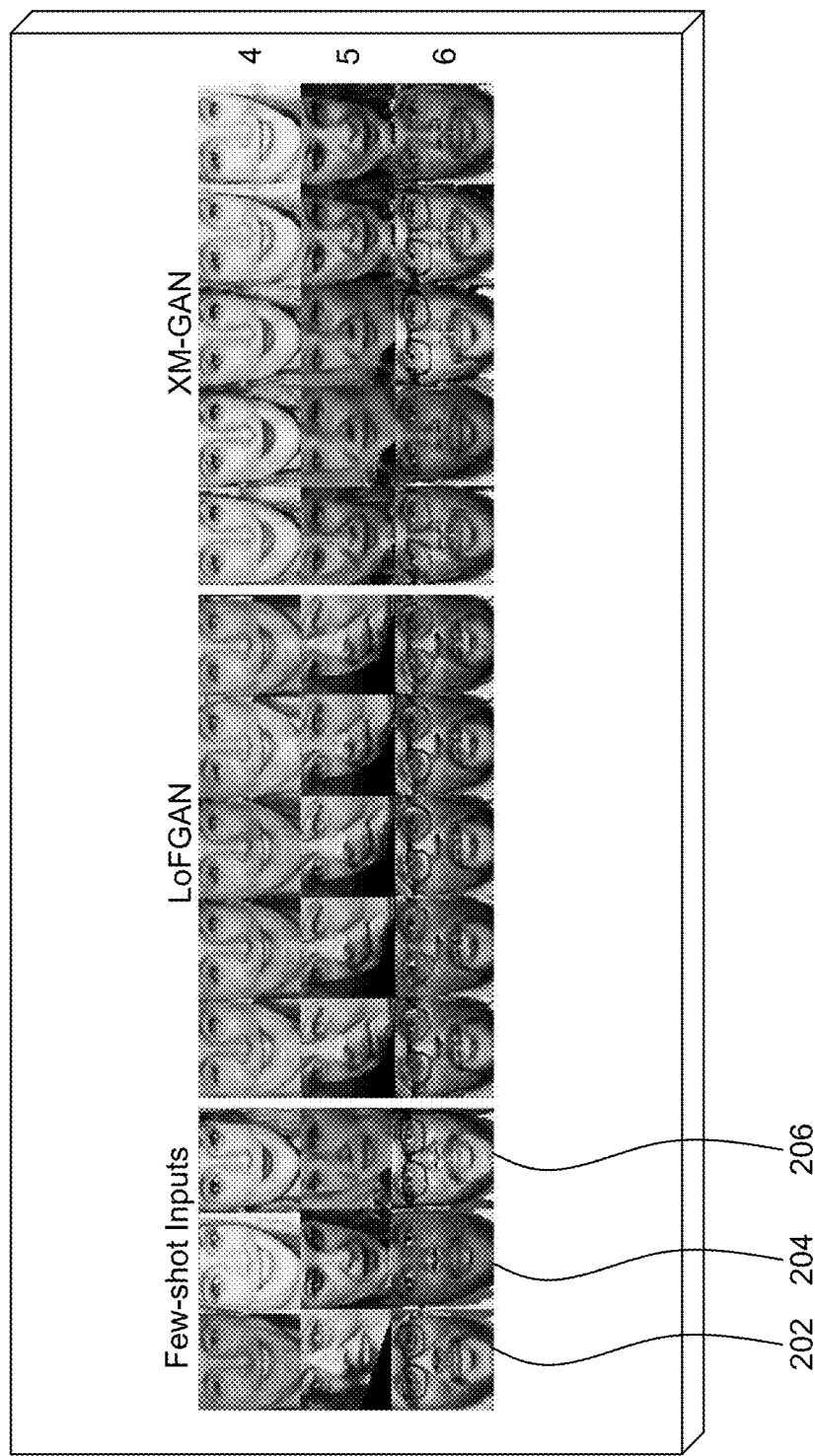
Figure 2C:
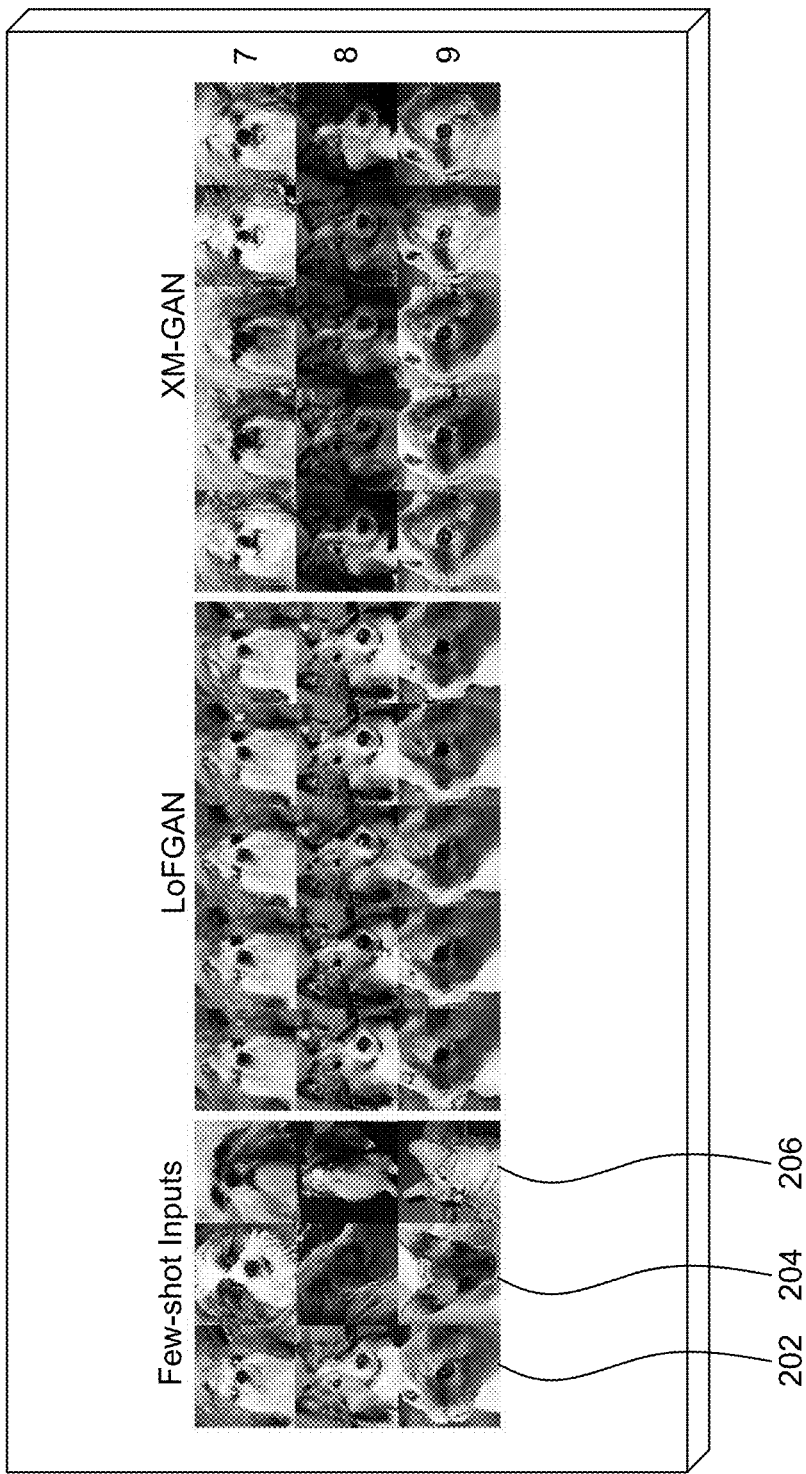

FIGS. 2A, 2B, 2C illustrate a comparison of generated images between the LoFGAN approach and the disclosed XM-GAN on example few-shot inputs from Flowers, VGG-Face, and Animal Faces datasets. See Gu et al. Each row depicts three sample images (base: column 202, reference: columns 204 and 206) of a class that are utilized as few-shot (here, K=3) inputs for generating additional images for the same class. While the state-of-the-art LoFGAN produces images having artifacts as well as lower diversity, the disclosed XM-GAN generates images with high-quality (see rows 2, 3, 9) and diversity (see rows 1, 4, 6).

For example, in the 3rd row, spectacles and eyes that are distorted in the case of LoFGAN are generated with better quality in the case of XM-GAN. Similarly, in row 6, it can be seen that XM-GAN generates a diverse range of colors for the generated images.

As is clearly evident in FIGS. 2A, 2B, 2C, LoFGAN struggles to generate diverse images and in most cases the outputs substantially resemble the base image due to the retention of a certain percentage of features from the input base image during the random feature selection and replacement procedure.

The disclosed few-shot image generation framework provides a solution to the conventional fusion approaches, such as that in LoFGAN, and generates high-quality yet diverse images. It has been determined that aggregating information densely from all local regions in a reference image can generate high-quality images. Furthermore, the present few-shot image generation framework incorporates a controlled fusion scheme to ensure diverse image generation. Such a controlled fusion scheme enables user control of generation of diverse images from limited K-shot examples. Moreover, the parameterized controlled fusion scheme also provides users with control over the image generation process.

In a few-shot (formally a K-shot) image generation task, the goal is to generate diverse set of images from K input examples X of a novel category. Let $\mathcal{D}^s$ and $\mathcal{D}^u$ be the set of seen categories and unseen categories, respectively, where $\mathcal{D}^s \cap \mathcal{D}^u = \emptyset$. In the training stage, images are sampled from $\mathcal{D}^s$ and are used to train the model to learn transferable generation ability to produce new images for unseen categories. During inference, given K images from an unseen category in $\mathcal{D}^u$, the trained model strives to produce high-quality yet diverse images for this unseen category without any further fine-tuning.

Architecture

Figure 3:
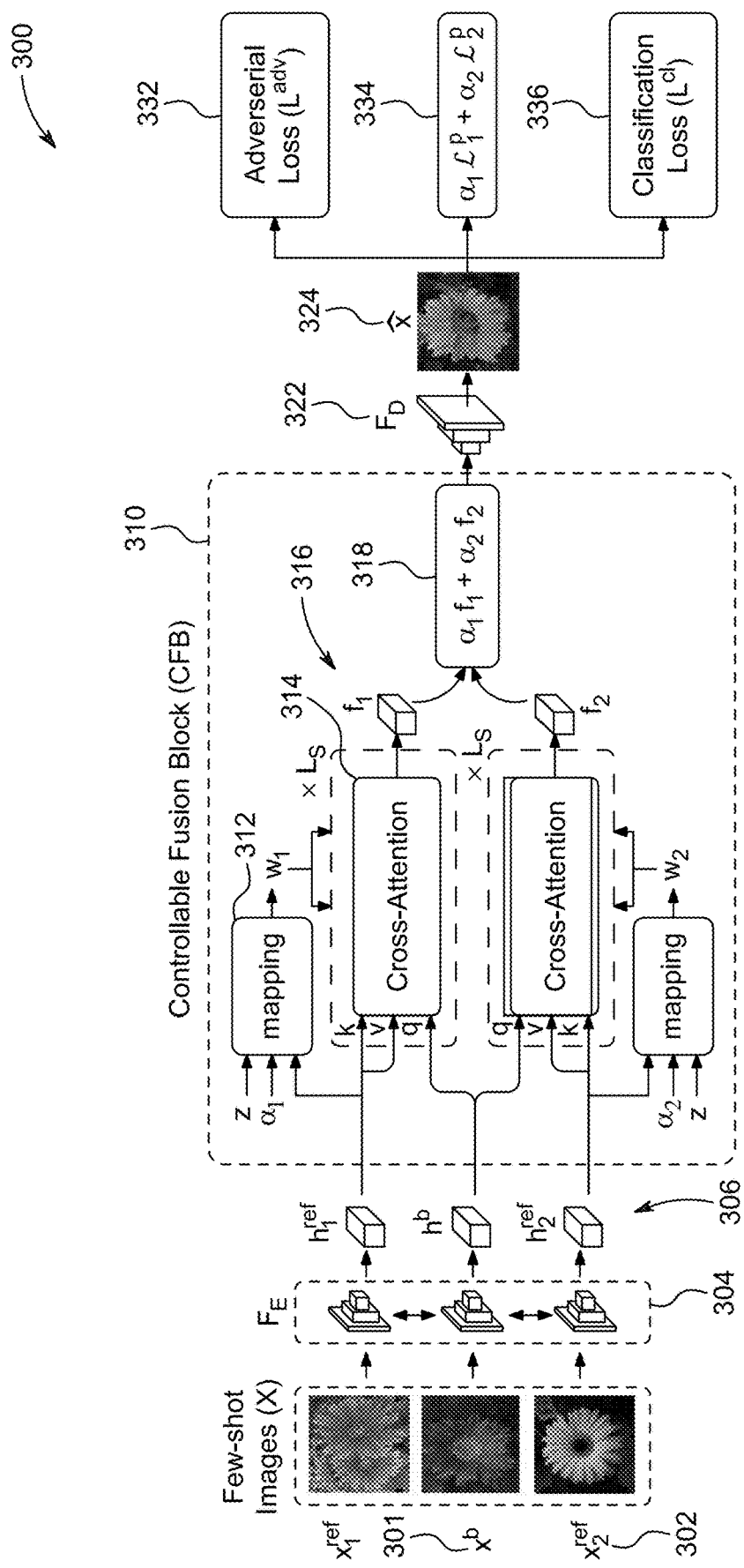
FIG. 3 is a diagram of a machine learning system for FS image generation, in accordance with an exemplary aspect of the disclosure.

FIG. 3 shows the overall network architecture of the disclosed few-shot image generation framework, named XM-GAN. Here, an image is randomly assigned from X as a base image $x^b$ 301, and denote the remaining K−1 images as reference $\{x_i^{ref}\}_{i=1}^{K-1}$ 302. Given the input images X, a feature representation of the base image and each reference image is obtained by passing them through the shared encoder $\mathcal{F}_E$ 304. Next, the encoded feature representations h 306 are input to a controllable fusion block 310, where cross-attention is performed between the base and reference features, $h^b$ and $h_i^{ref}$, respectively. See Vaswani et al.

The controllable fusion block (CFB) 310 aims to generate diverse yet high-quality images that are semantically aligned with the reference images. Within the CFB 310, a mapping network 312 is utilized to compute meta-weights $w_i$ using the global-level reference image features, control parameters $\alpha = \{\alpha_1, \ldots, \alpha_{K-1}\}$ and noise z. The meta-weights $w_i$ are employed to generate the modulation weights used for re-weighting the visual features obtained during the cross-attention between reference and base image features. As a result, the control parameters $\alpha_i$ (through the meta-weights $w_i$) enable the CFB 310 to regulate the extent to which each reference image $x_i^{ref}$ 302 should impact the newly generated image $\hat{x}$ 324. Furthermore, the control parameters $\alpha_i$ are employed to fuse (see 318) the cross-attended features $\{f_i\}_{i=1}^{K-1}$ 316 in the CFB 310. The resulting fused representation f is input to a decoder $\mathcal{F}_D$ 322 to generate image $\hat{x}$ 324. The whole framework 300 is trained following the standard GAN paradigm, where a discriminator network distinguishes the generated images from the real ones through an adversarial loss term $\mathcal{L}^{adv}$ 332, while an auxiliary classifier network ensures the generated images belong to the desired category via the classification loss term $\mathcal{L}^{cl}$ 336. See Lim, J. H., Ye, J. C.: Geometric gan. In: arXiv preprint arXiv:1705.02894 (2017), incorporated herein by reference in its entirety. Moreover, a guided perceptual loss term $\mathcal{L}^p$ 334, utilizing the control parameters $\alpha_i$, is introduced to aid the generated image to be perceptually similar to the reference images. Next, the CFB 310 is described in detail.

Controllable Fusion Block

As described above, the controllable fusion block (CFB 310) comprises a shared cross-transformer followed by a feature fusion mechanism 318. The shared cross-transformer consists of a cross-attention module 314 that performs spatial mixing of the input features followed by a feed-forward network (FFN) that point-wise refines the cross-attended features.

Figure 4:
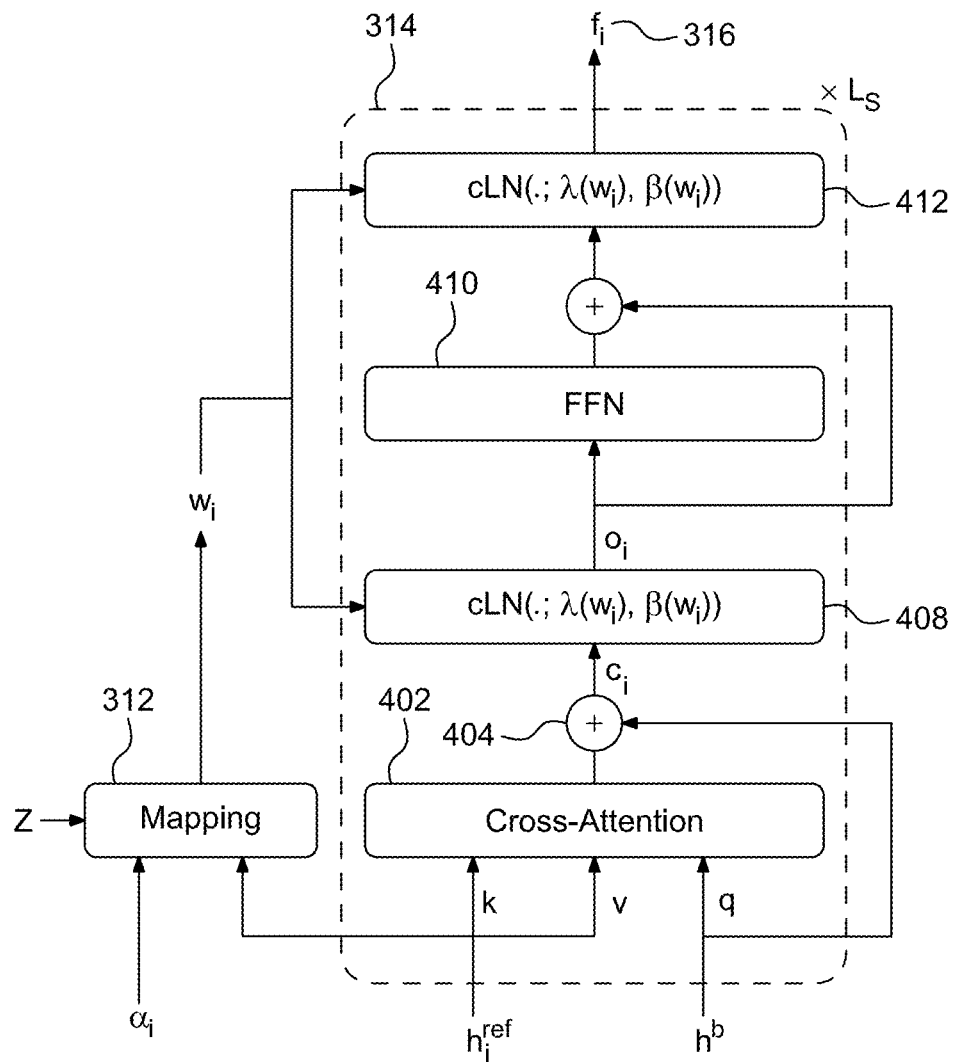
FIG. 4 is a block diagram of cross-attending the base and reference image features using a controllable cross-modulated layer norm, in accordance with an exemplary aspect of the disclosure.

FIG. 4 is a block diagram of cross-attending the base and reference image features using a controllable cross-modulated layer norm. Here, the cross-transformer takes spatially flattened base and reference features, $h^b, h_i^{ref} \in \mathbb{R}^{n \times D}$, from the encoder 304 as input, where n denotes the spatially flattened dimension. First, the base image features $h^b$ are mapped to M low-dimensional query embeddings $q^m \in \mathbb{R}^{n \times d}$, while the reference image features $h_i^{ref} \in \mathbb{R}^{n \times D}$ are mapped to keys $k_i^m \in \mathbb{R}^{n \times d}$ and values $v_i^m \in \mathbb{R}^{n \times d}$, where d=D/M with M as the number of attention heads. Next, a cross-attention function 402 maps the queries to outputs $r_i^m$ using the key-value pairs. Finally, the outputs $r_i^m$ from all M heads are concatenated 404 and processed by a learnable weight matrix $W \in \mathbb{R}^{D \times D}$ to generate cross-attended features $c_i \in \mathbb{R}^{n \times D}$ given by $$c_i = [r_i^1, \cdots, r_i^M]W + h^b, \text{ where } r_i^m = \text{softmax}\left(\frac{q^m k_i^{mT}}{\sqrt{d}}\right)v_i^m. \quad (1)$$

Consequently, the multi-headed cross-attention mechanism densely aggregates relevant input image features, based on pairwise attention scores between each position in the base image with every region of the reference image. Such a dense aggregation of relevant reference image features at a global receptive field results in locally consistent features that achieve reduced artifacts in generated images. Next, a controllable feature modulation mechanism in the cross-transformer is described which further enhances the diversity and quality of generated images.

Controllable Feature Modulation

The cross-attention mechanism, described above, computes locally consistent features that generate images with reduced artifacts. However, given the deterministic nature of the cross-attention and the limited set of reference images, simultaneously generating diverse and high-quality images in the few-shot setting is still a challenge. To this end, a controllable feature modulation mechanism is introduced within the CFB 310 that aims at improving the diversity and quality of generated images. The proposed modulation incorporates stochasticity as well as enhanced control in the feature aggregation and refinement steps. This is achieved by utilizing the output of a mapping network 312 for modulating (re-weighting) the visual features in the layer normalization modules in the cross-transformer.

Mapping Network

The mapping network 312 generates meta-weights w by taking three inputs: (i) reference features $h_i^{ref} \in \mathbb{R}^{n \times D}$, (ii) control parameter $\alpha_i$ and (iii) a Gaussian noise vector $z \sim \mathcal{N}(0,1)$. First, the reference features $h_i^{ref}$ are passed through a linear transformation $\psi(\cdot)$ and spatially pooled to obtain a D-dimensional global-level feature $g_i^{ref} = \text{GAP}(\psi(h_i^{ref}))$, where GAP denotes global average pooling operation. Next, the control parameter $\alpha_i$ is transformed to a latent encoding using another linear transformation $\psi_\alpha(\cdot)$, while the noise embedding $z \in \mathbb{R}^{D_z}$ is also transformed to a D-dimensional latent encoding through a mapping $\psi_z(\cdot)$. Finally, the meta-weights $w_i \in \mathbb{R}^D$ are generated by the mapping network 312, given by $$w_i = g_i^{ref} \odot \psi_\alpha(\alpha_i) + \psi_z(z), \quad (2)$$

where $\odot$ denotes element-wise multiplication. As a result, the meta-weights $w_i$ encode the reference image-specific information in a controlled manner through $\alpha_i$.

Figure 5A:
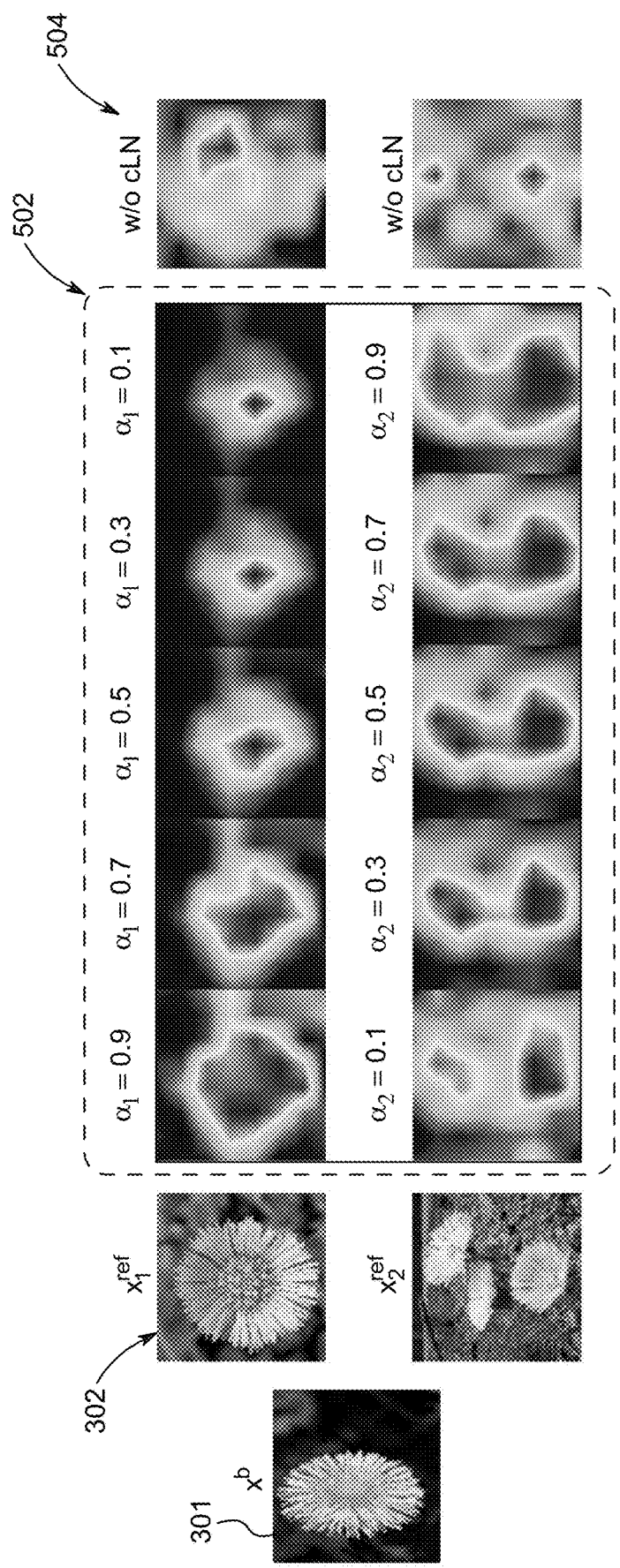
FIGS. 5A and 5B are example attention maps obtained from the cross-attended features f of two base images in the Flowers dataset.
Figure 5B:
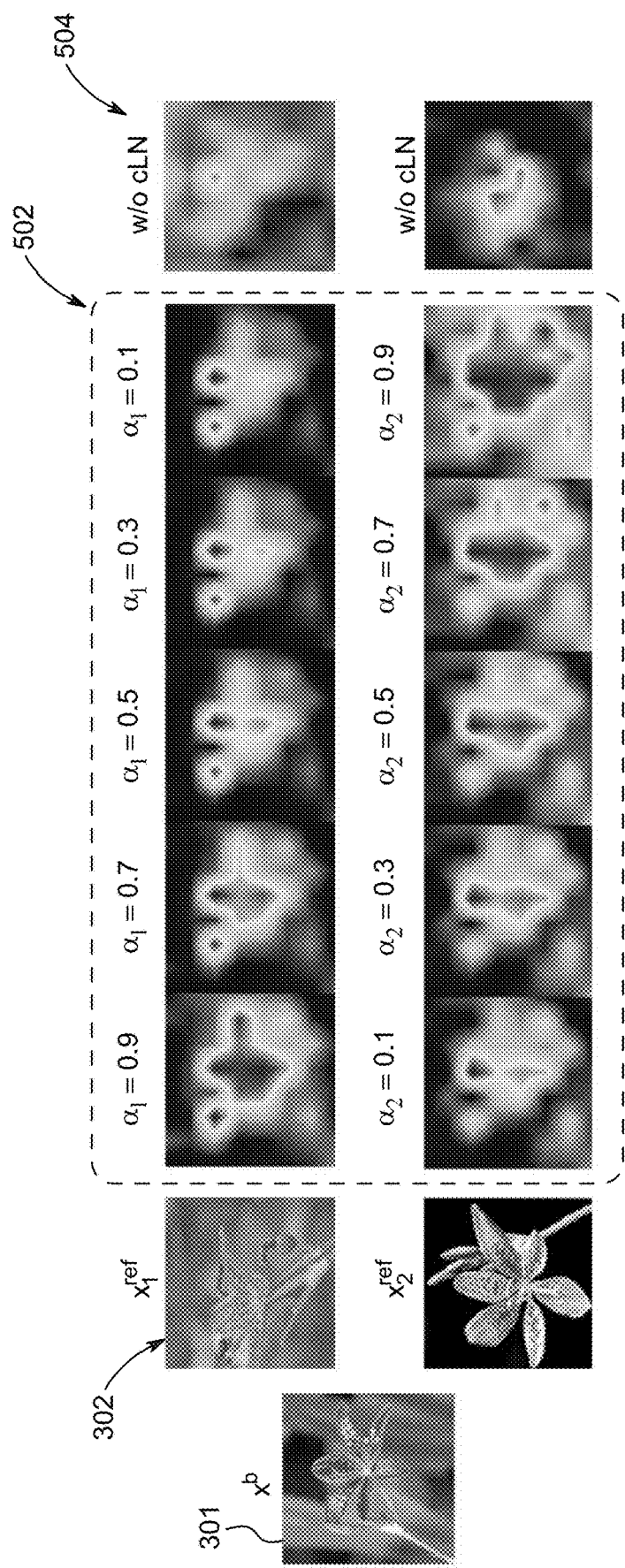

FIGS. 5A and 5B are example attention maps obtained from the cross-attended features $f_i$ of two base images 301 in the Flowers dataset. For a base image $x^b$, 301 each row presents the influence of the control parameter $\alpha_i$ on the attention maps (502 inside dotted box) of the corresponding reference images $x_i^{ref}$ 302 for a fixed noise z. The attention strength on each cross-attended feature changes proportionally to the corresponding $\alpha_i$ value. The last column 504 is the attention map in the case of standard layer normalization LN (i.e., without control), which fails to incorporate such a controllable modulation to the attention maps of reference images 302. The controllable feature modulation enables the achievement of high-quality and diverse image generation.

Referring to FIG. 4, the $w_i$ are employed for modulating the features in the controllable cross-modulated layer normalization 408, as described next.

Controllable Cross-Modulated Layer Normalization (CLN)

A standard layer normalization LN module learns input-independent modulation weights for normalizing the input features. See Ba, J. L., Kiros, J. R., Hinton, G. E.: Layer normalization. In: arXiv preprint arXiv:1607.06450 (2016), incorporated herein by reference in its entirety. In contrast to the standard layer normalization, its self-modulated variant modulates the features by learning input noise-dependent weights. See Chen, T., Lucic, M., Houlsby, N., Gelly, S.: On self modulation for generative adversarial networks. In: arXiv preprint arXiv:1810.01365 (2018), incorporated herein by reference in its entirety. However, different from Chen et al. and Lee et al. that utilize self-modulated weights, the cLN 312 learns sample-dependent modulation weights for normalizing features since it is desired to generate images that are perceptually similar to the few-shot input samples. See Chen et al.; and Lee, K., Chang, H., Jiang, L., Zhang, H., Tu, Z., Liu, C.: Vitgan: Training gans with vision transformers. In: ICLR (2022), each incorporated herein by reference in their entirety. Such a dynamic modulation of features enables the disclosed framework to generate images of high-quality and diversity. To this end, the meta-weights $w_i$ are utilized for computing the modulation parameters $\lambda$ and $\beta$ in layer normalization modules. Since the meta-weights encode the global-level features specific to the reference image input in a controllable manner, the modulation parameters $\lambda$ and $\beta$ also become reference image-dependent and controllable. With the cross-attended feature ci as input, the controllable cross-modulated layer normalization (cLN) 408 modulates the input to produce an output feature $o_i \in \mathbb{R}^{n \times D}$, given by $$o_i = cLN(c_i, w_i) = \lambda(w_i) \odot \frac{c_i - \mu}{\sigma} + \beta(w_i), \quad (3)$$

where $\mu$ and $\sigma^2$ are the estimated mean and variance of the input $c_i$. Here, $\lambda(w_i)$ is computed as the element-wise multiplication between meta-weights $w_i$ and sample-independent learnable weights $\lambda \in \mathbb{R}^D$, as $\lambda \odot w_i$. A similar computation is performed for $\beta(w_i)$. Consequently, the normalization mechanism achieves a controllable modulation of the input features based on the reference image inputs and enables enhanced diversity and quality in the generated images. The resulting features $o_i$ are then passed through a feed-forward network (FFN) 410 followed by another cLN 412 for preforming point-wise feature refinement, as shown in FIG. 4.

The above described mechanism of cross-attentive dense spatial mixing along with point-wise refinement and controlled layer normalization is progressively performed over $L_s$ layers to obtain enriched cross-attended feature $f_i \in \mathbb{R}^{n \times D}$ 316. Afterwards, the features $f_i$ 316 are aggregated using control parameters $\alpha_i$ to obtain the fused feature representation $f = \Sigma_i \alpha_i f_i$ 318, where $i \in [1, \ldots, k-1]$. Finally, the decoder $\mathcal{F}_D$ 322 decodes the fused representation f and generates images $\hat{x}$ 324 of high-quality and diversity.

Training and Inference

Training

The XM-GAN framework 300 is trained end-to-end using a joint formulation comprising three loss terms: (i) perceptual loss $\mathcal{L}^p$ 334 guided by control parameter $\alpha_i$, (ii) a standard adversarial loss $\mathcal{F}^{adv}$ 332 and (iii) a classification loss $\mathcal{F}^{cl}$ 336. To encourage the generated image $\hat{x}$ 324 to be perceptually similar to the reference images based on the specified control parameters $\alpha$, a parameterized formulation of the standard perceptual loss is utilized, given by $$\mathcal{L}^p = \sum_i \alpha_i \mathcal{L}_i^p, \text{ where } \mathcal{L}_i^p = \mathbb{E}[\|\phi(\hat{x}) - \phi(x_i^{ref})\|_2]. \quad (4)$$

See Johnson, J., Alahi, A., Fei-Fei, L.: Perceptual losses for real-time style transfer and super-resolution. In: ECCV (2016), incorporated herein by reference in its entirety.

Here, $\phi(x)$ denotes the feature representation of an image x computed by a pretrained VGG19 network. See Simonyan, K., Zisserman, A.: Very deep convolutional networks for large-scale image recognition. In: arXiv preprint arXiv:1409.1556 (2014), incorporated herein by reference in its entirety. In addition, to enable the decoder $\mathcal{L}_D$ 322 to generate realistic images $\hat{x}$ 324, an adversarial loss 332 is employed, utilizing a discriminator $\mathcal{F}_{Dis}$. See Lim et al. With generator $\mathcal{F}_G$ denoting the encoder 304, CFB 310 and decoder 322 together, the adversarial loss $\mathcal{F}^{adv}$ 332 is given by $\mathcal{F}^{adv} = \mathcal{L}_{\mathcal{F}_G}^{adv} + \mathcal{L}_{\mathcal{F}_{Dis}}^{adv}$, where $$\mathcal{L}_{\mathcal{F}_{Dis}}^{adv} = \mathbb{E}_{x \sim real}[\max(0, 1 - \mathcal{F}_{Dis}(x))] + \quad (5)$$
$$\mathbb{E}_{\hat{x} \sim fake}[\max(0, 1 + \mathcal{F}_{Dis}(\hat{x}))] \text{ and } \mathcal{L}_{\mathcal{F}_G}^{adv} = -\mathbb{E}_{\hat{x} \sim fake}[\mathcal{F}_{Dis}(\hat{x})].$$

Furthermore, a classifier $\mathcal{F}_C$ enforces that the images generated by the decoder 322 are classified into the corresponding class of the input few-shot samples. This is achieved by using a standard cross-entropy loss $\mathcal{F}^{cl}$. Consequently, the XM-GAN 300 is trained using the joint formulation:

$$\mathcal{L} = \mathcal{L}^{adv} + \eta_p \mathcal{L}^p + \eta_{cl} \mathcal{L}^{cl}, \quad (6)$$

where $\eta_p$ and $\eta_{cl}$ are hyperparameters for weighting the loss terms.

FS Image Generation (Inference):

During inference, multiple high-quality and diverse images $\hat{x}$ 324 are generated by varying the control parameter values $\alpha_i$ for a set of fixed K-shot samples. While a base image $x^b$ and $\alpha_i$ can be randomly selected, the disclosed framework enables a user to have control over the type of images to be generated based on the choice of $\alpha_i$ values.

In summary, the disclosed few-shot image generation framework 300, XM-GAN, learns to generate high-quality yet diverse images by (i) densely aggregating the relevant local information from reference images at a global-receptive field and (ii) controllably modulating the image features using meta-weights computed based on the input reference images.

Figure 6:
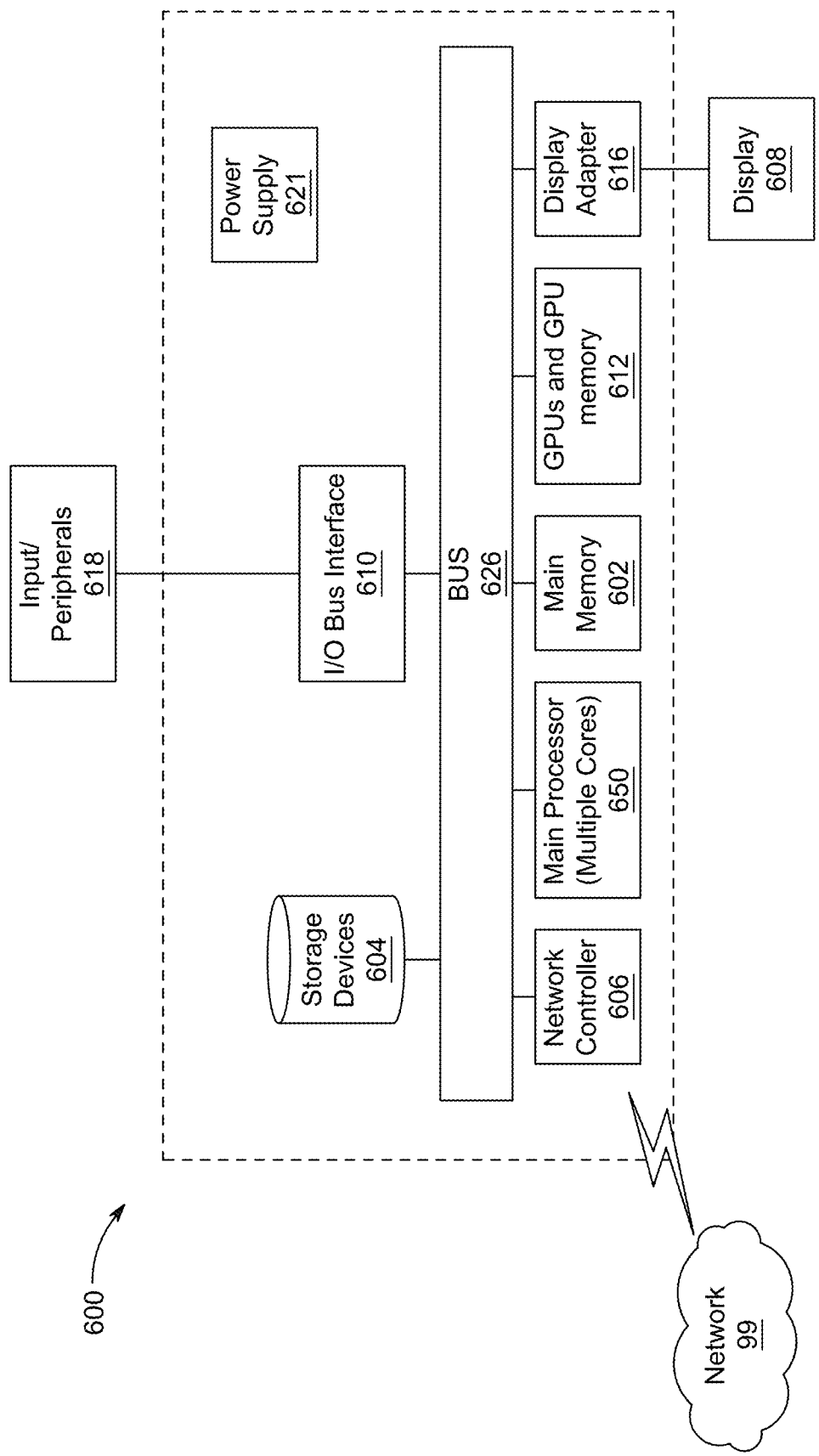
FIG. 6 is a block diagram illustrating an example computer system for implementing the machine learning training and inference methods according to an exemplary aspect of the disclosure.

FIG. 6 is a block diagram illustrating an example computer system for implementing the machine learning training and inference methods according to an exemplary aspect of the disclosure. The computer system may be an AI workstation running a server operating system, for example Ubuntu Linux OS, Windows, a version of Unix OS, or Mac OS. The computer system 600 may include one or more central processing units (CPU) 650 having multiple cores. The computer system 600 may include a graphics board 612 having multiple GPUs, each GPU having GPU memory. The graphics board 612 may perform many of the mathematical operations of the disclosed machine learning methods. The computer system 600 includes main memory 602, typically random access memory RAM, which contains the software being executed by the processing cores 650 and GPUs 612, as well as a non-volatile storage device 604 for storing data and the software programs. Several interfaces for interacting with the computer system 600 may be provided, including an I/O Bus Interface 610, Input/Peripherals 618 such as a keyboard, touch pad, mouse, Display Adapter 616 and one or more Displays 608, and a Network Controller 606 to enable wired or wireless communication through a network 99. The interfaces, memory and processors may communicate over the system bus 626. The computer system 600 includes a power supply 621, which may be a redundant power supply.

In some embodiments, the computer system 600 may include a CPU and a graphics card, for example one made by NVIDIA, in which the GPUs have multiple cores. In some embodiments, the computer system 600 may include a machine learning engine 612, such as the SoC of Apple (e.g., M2 or M3), as well as those machine learning optimized systems made by NVIDIA.

Figure 7:
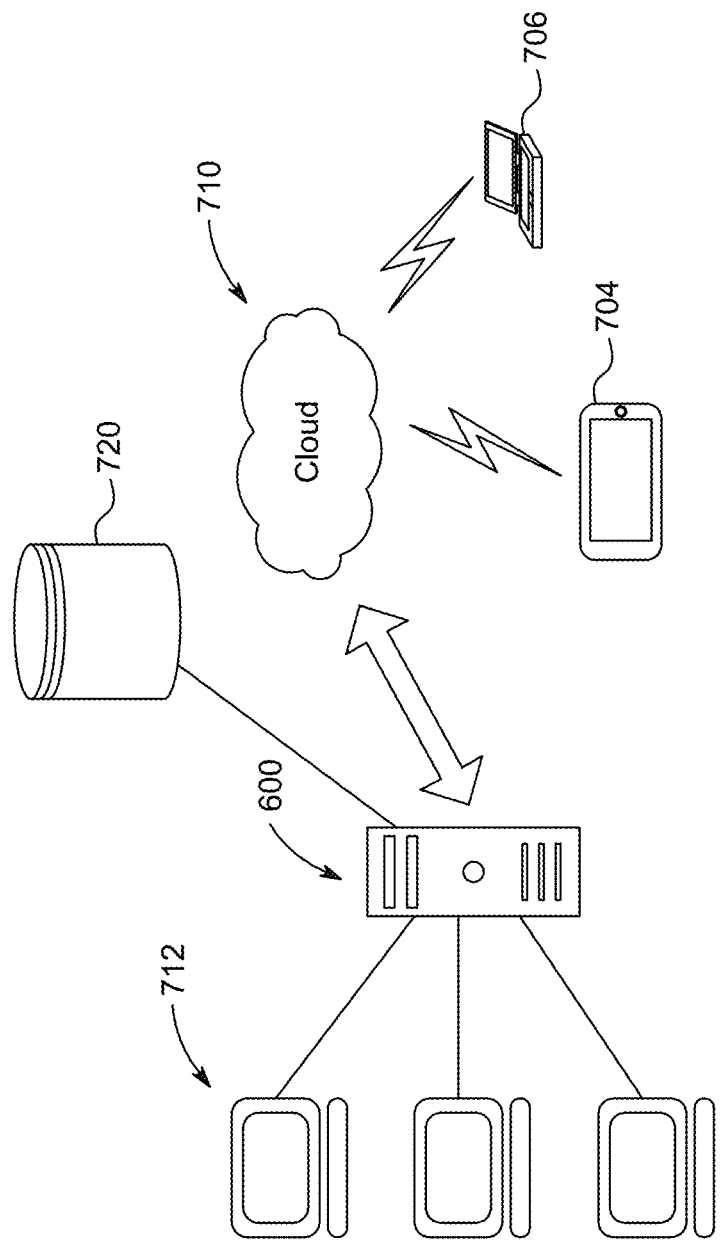
FIG. 7 is a diagram of a machine learning system for generating stock photography in accordance with an exemplary aspect of the disclosure.

FIG. 7 is a diagram of a machine learning system for generating stock photography in accordance with an exemplary aspect of the disclosure. In an exemplary embodiment, a server or artificial intelligence (AI) workstation 600 may be configured for few-shot image generation. With such a configuration, one or more client computers 712 may be used to perform few-shot image generation for several images at a time. In the embodiment, the server 600 may be connected to a cloud service 710. The cloud service 710 may be accessible via the Internet. The cloud service 610 may provide a database service and may serve stock images to Web sites. Mobile devices 704, 706 may search for stock photography images stored by the cloud service 710 or in a database system 720 for storing stock photography.

Figure 8A:
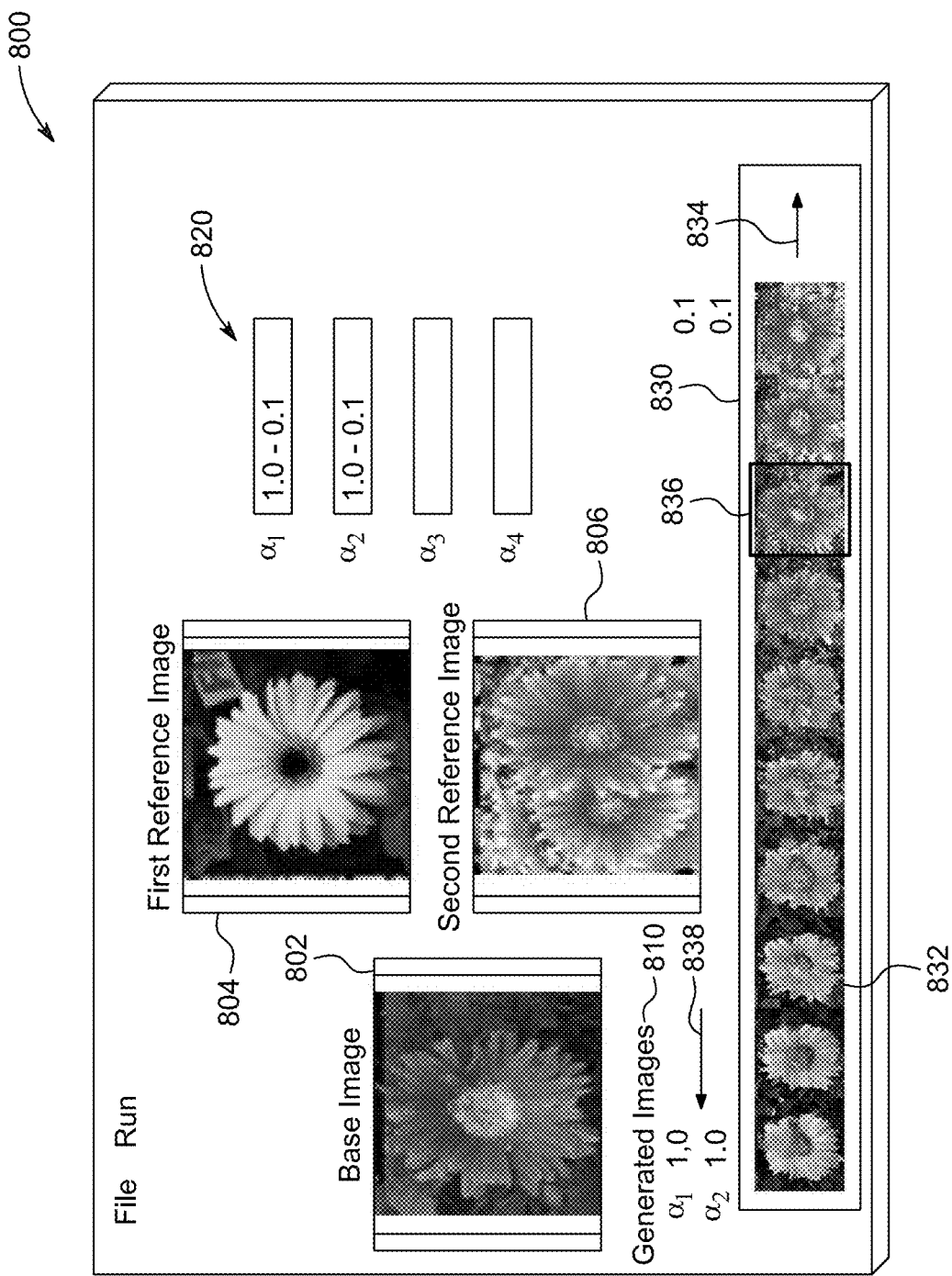
FIGS. 8A, 8B, 8C illustrate a non-limiting user interface screen for user control of image generation, in accordance with an aspect of the disclosure.
Figure 8B:
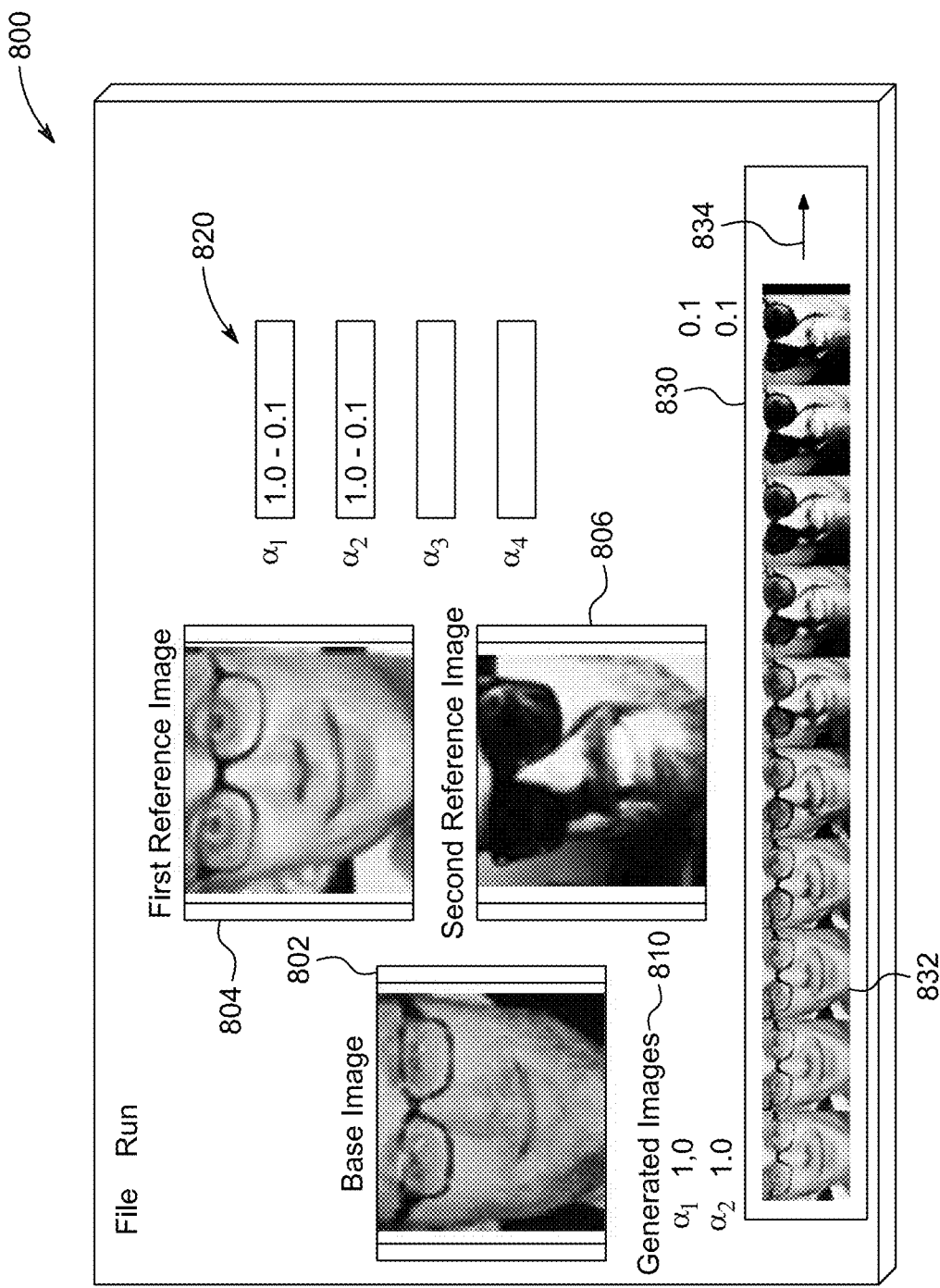
Figure 8C:
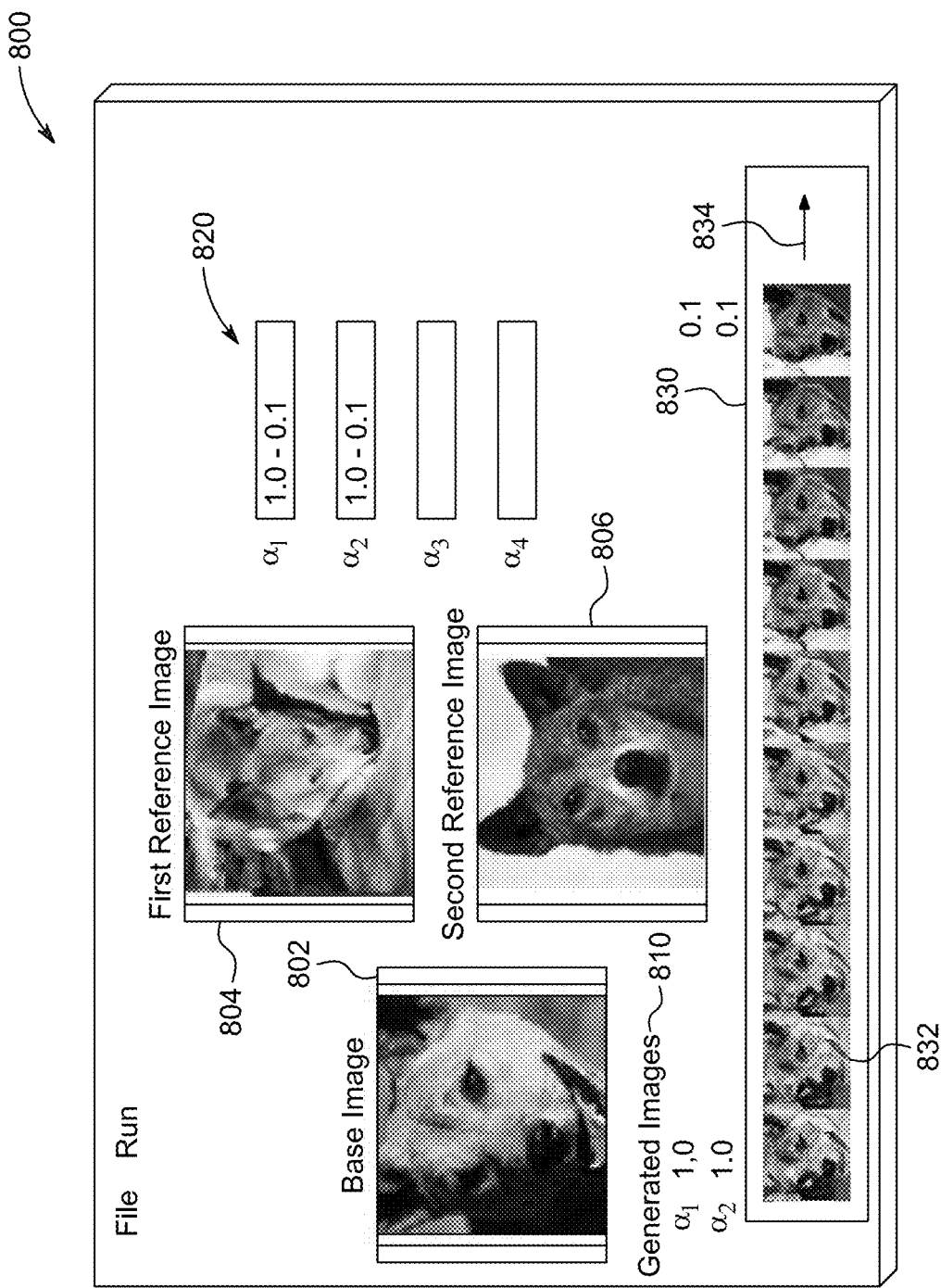

FIGS. 8A, 8B, 8C illustrate a non-limiting user interface screen for user control of image generation, in accordance with an aspect of the disclosure. In the user interface screen 800, a user enters a base image 802 and two or more reference images 804, 806. A user enters one or more values of control parameters 820. Given a base image 802 along with two reference images 804, 806, the above-described few-shot (FS) image generation approach produces high-quality yet diverse generated images 810 in a manner that is controllable by way of an input of values for one or more of the control parameters 820 ($\alpha_1$, $\alpha_2$). Each of the control parameters 820 may be input as individual values, a range of values, or as specific comma-separated values. In XM-GAN 300, the control parameters 820 together with reference image features enable a controlled modulation and enrichment of visual features for generating high-quality yet diverse images.

As in FIGS. 8A, 8B, 8C, the display region 830 for the generated images 810 displays a list of continuous images. The list may be scrolled using a scroll bar 832 or a scroll arrow 834. Although the list of continuous images is shows as a horizontal list in FIGS. 8A, 8B, 8C, the list may be displayed in a vertical column. In one embodiment, the generated images 810 are displayed together with corresponding values 838 of control parameters. Also, a user may select a single image 836 in the list of images 830. In some embodiments, the user may select a range of images in the list of images. The selected image, or images may be saved in an image database, or simply in a folder.

Figure 9:
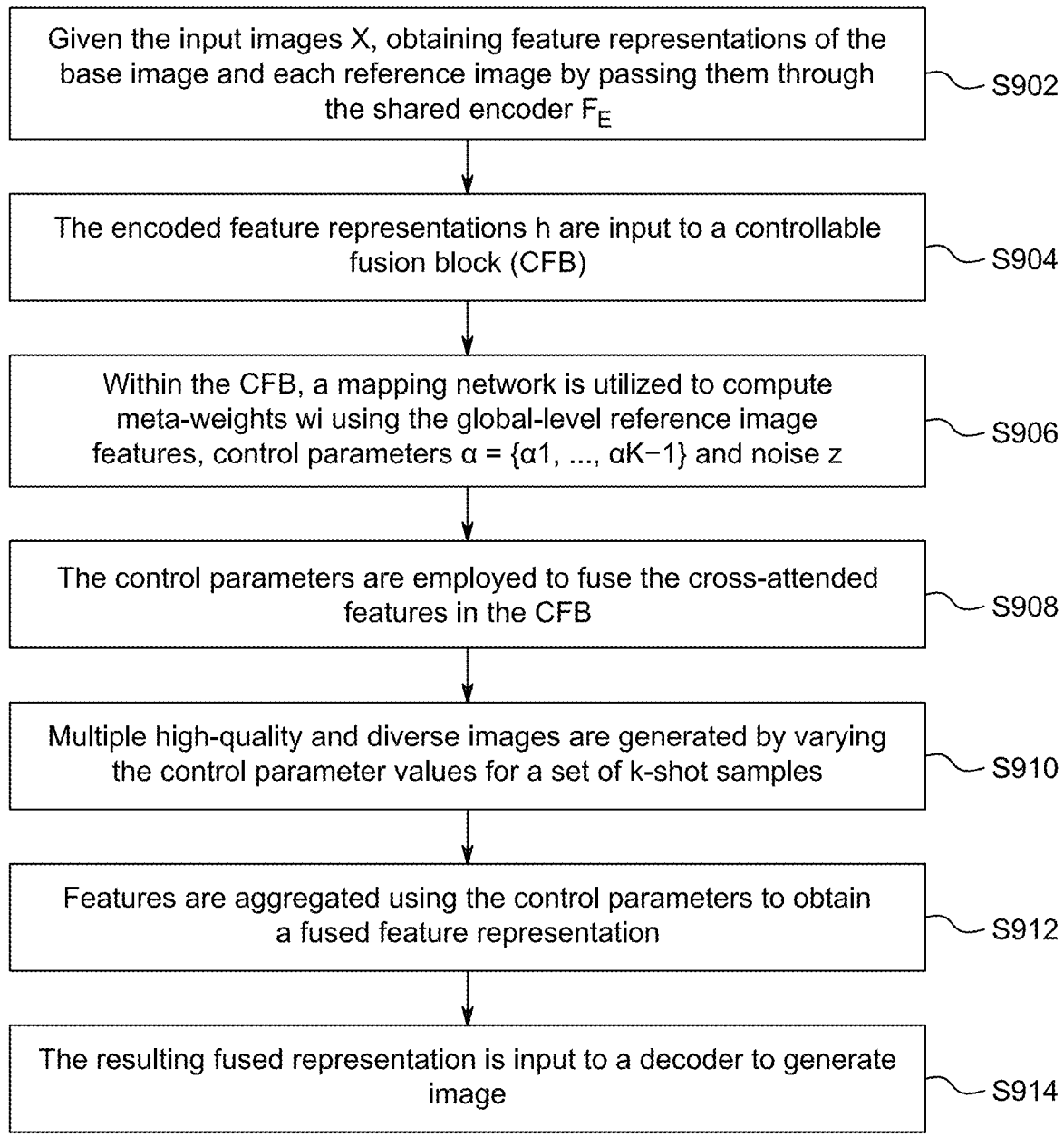
FIG. 9 is a flowchart of few-shot image generation, in accordance with an aspect of the disclosure.

FIG. 9 is a flowchart of few-shot image generation, in accordance with an aspect of the disclosure. In an embodiment, the XM-GAN 300 is provided as a downloadable software package. The software can be configured for running on a CPU 650 or can be configured for running on a GPU 612. In a preferred embodiment, the software package includes program instructions that can be executed on a GPU. The program instructions, which when executed by the GPU 612, perform a method including steps in FIG. 9.

In step S902, given the input images X, a feature representation of the base image and each reference image is obtained by passing them through the shared encoder $\mathcal{F}_E$ 304.

Next, in step S904, the encoded feature representations h 306 are input to a controllable fusion block (CFB) 310, where cross-attention is performed between the base and reference features, $h^b$ and $h_i^{ref}$, respectively.

In step S906, within the CFB 310, a mapping network 312 is utilized to compute meta-weights $w_i$ using the global-level reference image features, control parameters $\alpha = \{\alpha_1, \ldots, \alpha_{K-1}\}$ and noise z.

In step S908, the control parameters $\alpha_i$ are employed to fuse (see 318) the cross-attended features $\{f_{i,j}\}_{i=1}^{K-1}$ 316 in the CFB 310.

In step S910, during inference, multiple high-quality and diverse images $\hat{x}$ 324 are generated by varying the control parameter values $\alpha_i$ for a set of fixed K-shot samples.

In S912, the features $f_i$ 316 are aggregated using control parameters $\alpha_i$ to obtain the fused feature representation f In S914, the decoder $\mathcal{F}_D$ 322 decodes the fused representation f and generates images 324 of high-quality and diversity.

Experiments

Experimental Setup

Datasets: Experiments were conducted on three challenging FS image generation benchmarks: Flowers, VGGFace and Animal Faces. See Nilsback, M. E., Zisserman, A.: Automated flower classification over a large number of classes. In: ICVGIP (2008); Cao, Q., Shen, L., Xie, W., Parkhi, O. M., Zisserman, A.: Vggface2: A dataset for recognising faces across pose and age. In: FG (2018); and Liu, M. Y., Huang, X., Mallya, A., Karras, T., Aila, T., Lehtinen, J., Kautz, J.: Few-shot unsupervised image-to-image translation. In: ICCV (2019), each incorporated herein by reference in their entirety. In the Flowers dataset, 102 categories (consisting 40 images each) are split into 85 seen and 17 unseen categories for training and evaluation. The VGGFace dataset is split into 1802 training and 552 validation classes. Similarly, the animal categories are split into 119 seen and 30 unseen classes in the Animal Faces dataset. Both VGGFace and Animal Faces datasets consist of 100 images in each of their categories. Evaluation Metrics: As in Gu et al., two metrics were utilized for evaluating different FS image generation approaches: (i) Frechet Inception Distance (FID) for measuring the similarity between generated and real features of unseen categories and (ii) Learned Perceptual Image Patch Similarity (LPIPS) for measuring the average pairwise feature distance among the generated images. See Gu et al.; Heusel, M., Ramsauer, H., Unterthiner, T., Nessler, B., Hochreiter, S.: Gans trained by a two time-scale update rule converge to a local nash equilibrium. In: NeurIPS (2017); Zhang, R., Isola, P., Efros, A. A., Shechtman, E., Wang, O.: The unreasonable effectiveness of deep features as a perceptual metric. In: CVPR (2018), each incorporated herein by reference in their entirety.

Implementation Details: The encoder $\mathcal{F}_E$ 304 and decoder $\mathcal{F}_D$ 322 both have five convolutional blocks with batch normalization and Leaky-ReLU activation, as in Gu et al. While the input image size is 128×128 pixels for Flowers and Animal Faces datasets, it is 64×64 pixels for VGGFace. The generated image is of the same size as the input. The resolution at the encoder output is equal to $\downarrow 16\times$ (downsampled) resolution of the input image. The feature dimension D is set to 256, while the noise dimension $D_z=128$. The linear transformation $\psi(\bullet)$ is implemented as a 1×1 convolution with input and output channels set to D. The weights $\eta_p$ and $\eta_{cl}$ are set to 45 and 1. We set K=3 in all the experiments, unless specified otherwise. The XM-GAN 300 is trained for 200K iterations with a batch-size of 8 using the Adam optimizer and a fixed learning rate of $10^{-4}$ in all experiments.

State-of-the-Art Comparison

FS Image Generation: The XM-GAN approach is compared with state-of-the-art methods in literature on three datasets. Table 1 presents the state-of-the-art comparison. Among existing fusion-based FS image generation works, MatchingGAN and F2GAN obtain FID scores of 143.4 and 120.5, respectively on the Flowers dataset. The recently introduced local fusion-based LoFGAN achieves improved performance with FID score of 79.3. See Hong et al.: Matchinggan: Matching-based few-shot image generation; Hong et al.: F2gan: Fusing-and-filling gan for few-shot image generation; and Gu et al. The XM-GAN that utilizes dense aggregation of relevant local information at a global receptive field along with controllable feature modulation outperforms LoFGAN with a significant margin of 19.2, achieving FID score of 60.1. Furthermore, the XM-GAN also achieves superior performance over LoFGAN in terms of LPIPS score (LoFGAN: 0.386 vs. XM-GAN: 0.406).

Table 1 lists state-of-the-art comparison, in terms of FID and LPIPS scores, on Flowers, VGGFace and Animal Faces datasets. The XM-GAN achieves consistent improvement in performance on both FID and LPIPS scores, outperforming the state-of-the-art LoFGAN on all three datasets. For each case, the best results are in bold.

TABLE 1

State-of-the-art comparison, in terms of FID and LPIPS scores, on Flowers, VGGFace and Animal Faces datasets.

| Method | Flowers | | VGGFace | | Animal Faces | |
| --- | --- | --- | --- | --- | --- | --- |
| | FID ($\downarrow$) | LPIPS ($\uparrow$) | FID ($\downarrow$) | LPIPS ($\uparrow$) | FID ($\downarrow$) | LPIPS ($\uparrow$) |
| FIGR | 190.1 | 0.063 | 139.8 | 0.083 | 211.5 | 0.076 |
| DAWSON | 189.0 | 0.058 | 137.8 | 0.077 | 208.7 | 0.064 |
| DAGAN | 151.2 | 0.081 | 128.3 | 0.091 | 155.3 | 0.089 |
| GMN | 200.1 | 0.074 | 136.2 | 0.090 | 220.4 | 0.087 |
| MatchingGAN | 143.3 | 0.163 | 118.6 | 0.169 | 148.5 | 0.151 |
| F$_2$GAN | 120.5 | 0.217 | 109.2 | 0.212 | 117.7 | 0.183 |
| LoFGAN | 79.3 | 0.386 | 20.3 | 0.287 | 112.1 | 0.496 |
| XM-GAN | 60.1 | 0.406 | 9.7 | 0.341 | 72.2 | 0.507 |

See Cloûatre, et al.; Liang et al.; Antoniou et al.; Bartunov et al.; Hong, et al.: Matchinggan: Matching-based few-shot image generation; Hong, Y. et al.: F2gan: Fusing-and-filling gan for few-shot image generation. In: ACM MM (2020); and Gu et al.

On the VGGFace dataset, the transformation-based DAGAN achieves FID and LPIPS score of 128.3 and 0.090, respectively. The global fusion-based F2GAN and the local fusion-based LoFGAN obtain FID score of 109.2 and 20.3 and LPIPS score of 0.213 and 0.287, respectively. The XM-GAN obtains state-of-the-art performance with a gain of 10.6 (absolute) and 18.8% (relative) over LoFGAN in terms of FID and LPIPS score, respectively. Similarly, XM-GAN also achieves consistent improvement in performance in terms of both FID and LPIPS scores over the best existing LoFGAN approach on Animal Faces.

Using Generated Images as Augmentation for Low-data Classification: Here, we evaluate the applicability of the images generated by the XM-GAN is evaluated as a source of data augmentation for the downstream task of low-data image classification for unseen categories. The unseen dataset is split into $D_{tr}$, $D_{val}$, $D_{test}$. Images of an unseen class are split into 10:15:15 in Flowers dataset. Similarly, images are divided into 30:35:35 for VGGFace and Animal Faces. Following Hong et al. and Gu et al., seen categories are used for initializing the ResNet18 backbone and a new classifier is trained using $D_{tr}$. This is referred to as Standard. Then, $D_{tr}$ is augmented with images generated by the XM-GAN using the same $D_{tr}$ as few-shot samples. For augmentation, 30 images are generated for Flowers and 50 images for VGGFace and Animal Faces in each unseen category. Table 2 shows the classification performance comparison. The FS generation models can aid to improve the low-data classification performance when compared to the performance without augmentation. Compared to the LoFGAN, the XM-GAN achieves absolute gains of 6.3%, 3.5% and 3.3% on Flowers, VGGFace and Animal Faces, respectively. See Gu et al.

Table 2 lists a low-data image classification performance comparison, in terms of top-1 accuracy, on Flowers, VGG-Faces and Animal Faces datasets. The disclosed XM-GAN achieves superior classification performance on all three datasets, compared to the recently introduced LoFGAN. For each dataset, the best results are in bold.

TABLE 2

Low-data image classification performance comparison.

| Method | Flowers Accuracy (%) | VGGFace Accuracy (%) | Animal Faces Accuracy (%) |
|---|---|---|---|
| Standard | 60.00 | 67.38 | 35.14 |
| MatchingGAN | 60.39 | 65.17 | 35.90 |
| LoFGAN | 65.10 | 68.97 | 36.19 |
| XM-GAN | 71.42 | 72.45 | 39.45 |

See Hong, et al.: Matchinggan: Matching-based few-shot image generation; and Gu et al.

Ablation Study

Here, the ablation study is presented to validate the merits of the disclosed contributions. The XM-GAN is applied to the FS image generation task by performing extensive qualitative, quantitative and human-based evaluations. The XM-GAN significantly outperforms the state-of-the-art in terms of both quality and diversity on three datasets: Flowers, VGGFace and Animal Faces. See Gu et al. On Flowers, XM-GAN achieves gains of 22.1 and 5.2% in terms of Frechet Inception Distance (FID) score and Learned Perceptual Image Patch Similarity (LPIPS) score, respectively, compared to the state-of-art. See Gu et al. In the human-based evaluation, the XM-GAN was preferred compared to the state-of-the-art, achieving human plausibility. Specifically, XM-GAN was preferred 86% of the time over the state-of-art, in terms of diversity on VGGFace. See Gu et al.

Table 3 lists the baseline comparison on the Flowers dataset. The Baseline comprises an encoder, a standard cross-transformer and a decoder. The encoder and decoder are the same, as in the XM-GAN. The cross-transformer contains the standard cross-attention mechanism with standard Layer normalization (LN) layers. The cross-attended features at the output of this transformer are fused with $a_i = 1/K-1$, where $i \in [1, \ldots, K-1]$. The baseline is trained with the standard adversarial and classification loss terms. This is denoted as Baseline in Table 3. Another experiment was conducted by extending the above-mentioned baseline with the standard perceptual loss since it encourages the reconstructed images to be perceptually similar to the input reference images. Here, $a_i = 1/K-1$ is utilized in Eq. 4. This is referred to as Baseline+PL. Alternatively, an additional baseline experiment was conducted using random values of $a_i$ s.t. $\Sigma_i a_i = 1$ for computing the fused feature f and parameterized perceptual loss (Eq. 4). This is referred to as Baseline+PPL. On the Flowers dataset, the Baseline achieves an FID score of 72.7 along with LPIPS score of 0.388. In comparison to the Baseline, the Baseline+PL that integrates the standard perceptual loss improves the FID by 3.5, while being on par in terms of the LPIPS score. T can be observed that naively parameterizing the perceptual loss as in Baseline+PPL, only marginally improves the FID score, while slightly deteriorating the LPIPS score, compared to Baseline+PL.

In Table 3, baseline refers to the framework comprising an encoder, a standard cross-transformer and a decoder, where both encoder and decoder are same, as in the XM-GAN. Baseline+PL refers to extending the Baseline by also integrating the standard perceptual loss. Also, are random values of $a_i$ s.t. $\Sigma_i a_i = 1$ employed during training to obtain the fused feature f and parameterized perceptual loss (Eq. 4). This baseline is referred as Baseline+PPL. Ther final proposed XM-GAN referred here as Baseline+PPL+cLN contains the novel CFB. Within the CFB, the impact of the reference image input features is validated for feature modulation by computing the meta-weights wi using only the Gaussian noise z in Eq. 2. This is denoted here as Baseline+PPL+cLN†. An approach based on the novel CFB that utilizes the reference image features together with control parameters and noise for computing meta-weights achieves the best performance (in bold here).

TABLE 3

Ablation study on the Flowers dataset.

| Method | FID ($\downarrow$) | LPIPS ($\uparrow$) |
|---|---|---|
| Baseline | 72.7 | 0.388 |
| Baseline + PL | 69.2 | 0.386 |
| Baseline + PPL | 68.6 | 0.384 |
| Baseline + PPL + cLN† | 65.3 | 0.300 |
| Baseline + PPL + cLN | 60.1 | 0.406 |

As discussed earlier a key contribution is the introduction of a novel controllable fusion block (CFB). Within the CFB, a controllable feature modulation is performed by jointly introducing a cross-modulated controllable layer normalization along with a mapping network. A final proposed approach is Baseline+PPL+cLN. The effect of the input reference image features is validated for feature modulation by generating the meta-weights, $w_i$ using only the Gaussian noise z in Eq. 2. This is denoted by Baseline+PPL+cLN†. It can be observed that modulating the features by employing meta-weights improves the performance over Baseline+PPL in terms of FID and LPIPS scores for both cases (Baseline+PPL+cLN† and Baseline+PPL+cLN). Furthermore, it can be observed that using noise z alone for computing meta-weights is sub-optimal since the feature modulation becomes independent of the input reference images and control parameters. This shows that the controllable feature modulation, which utilizes the reference image features together with control parameters and noise for computing meta-weights achieves the best performance, leading to generated images with high-quality and diversity.

Figure 10:
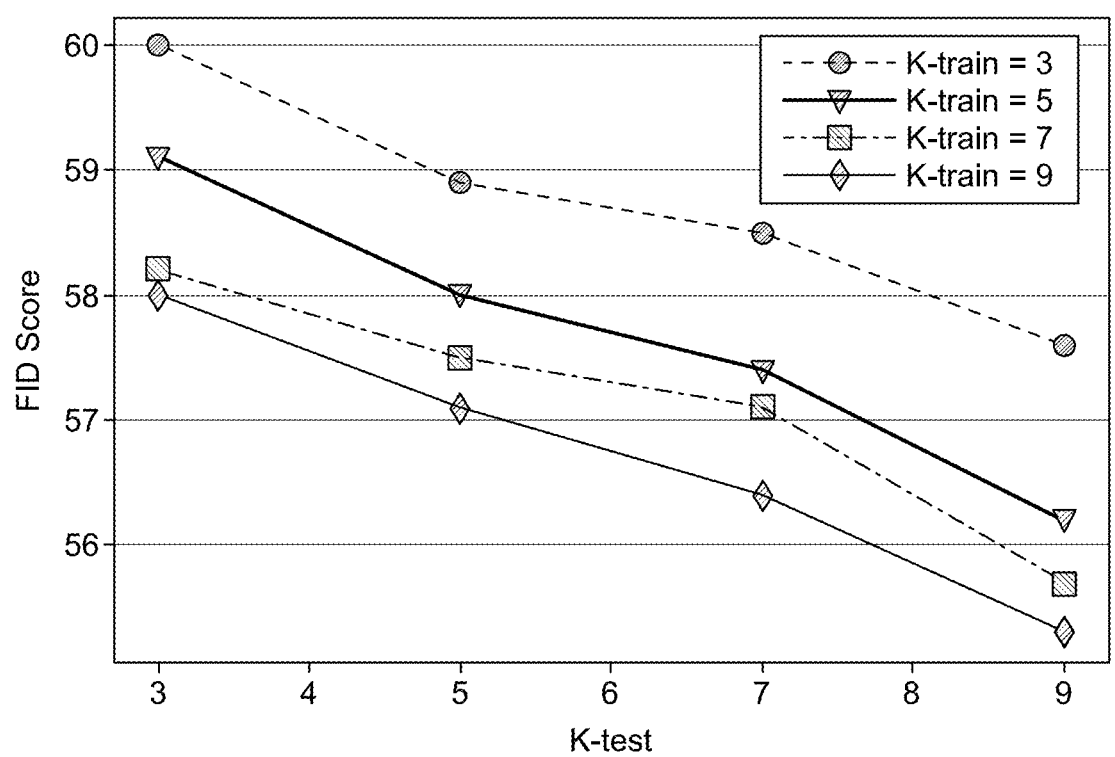
FIG. 10 illustrates the results, in terms of FID, using different combinations of K-train and K-test.

Varying the Number of Support Samples: As mentioned earlier, FS image generation experiments are conducted by setting K=3 for both training and inference. However, the XM-GAN can also generate images from different number of support samples (K). To this end, the XM-GAN is trained with K-train in {3, 5, 7, 9} on Flowers, and each trained model is evaluated using K-test in {3, 5, 7, 9}. FIG. 10 illustrates the results, in terms of FID, using different combinations of K-train and K-test. It can be observed that FID decreases when increasing K-test without changing K-train. Using more reference images during test is likely to increase the local semantic consistency at a global receptive field in the fused cross-attended features output by the CFB, leading to higher-quality generation. Moreover, increasing K-train for a constant K-test also lowers FID, likely due to improved convergence during training.

Qualitative Comparison

Figure 11A:
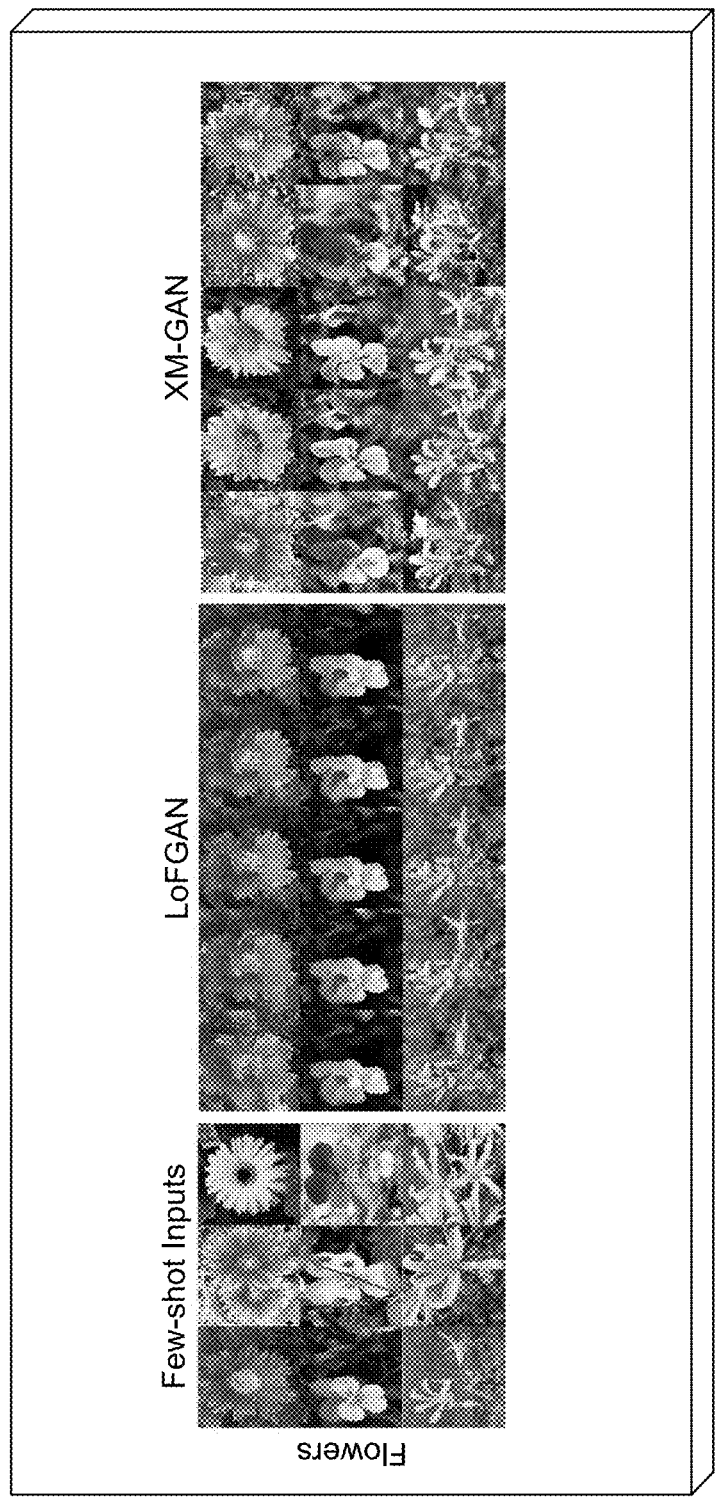
FIGS. 11A, 11B, 11C illustrate a qualitative comparison of the XM-GAN with LoFGAN on Flowers, VGGFace and Animal Faces.
Figure 11B:
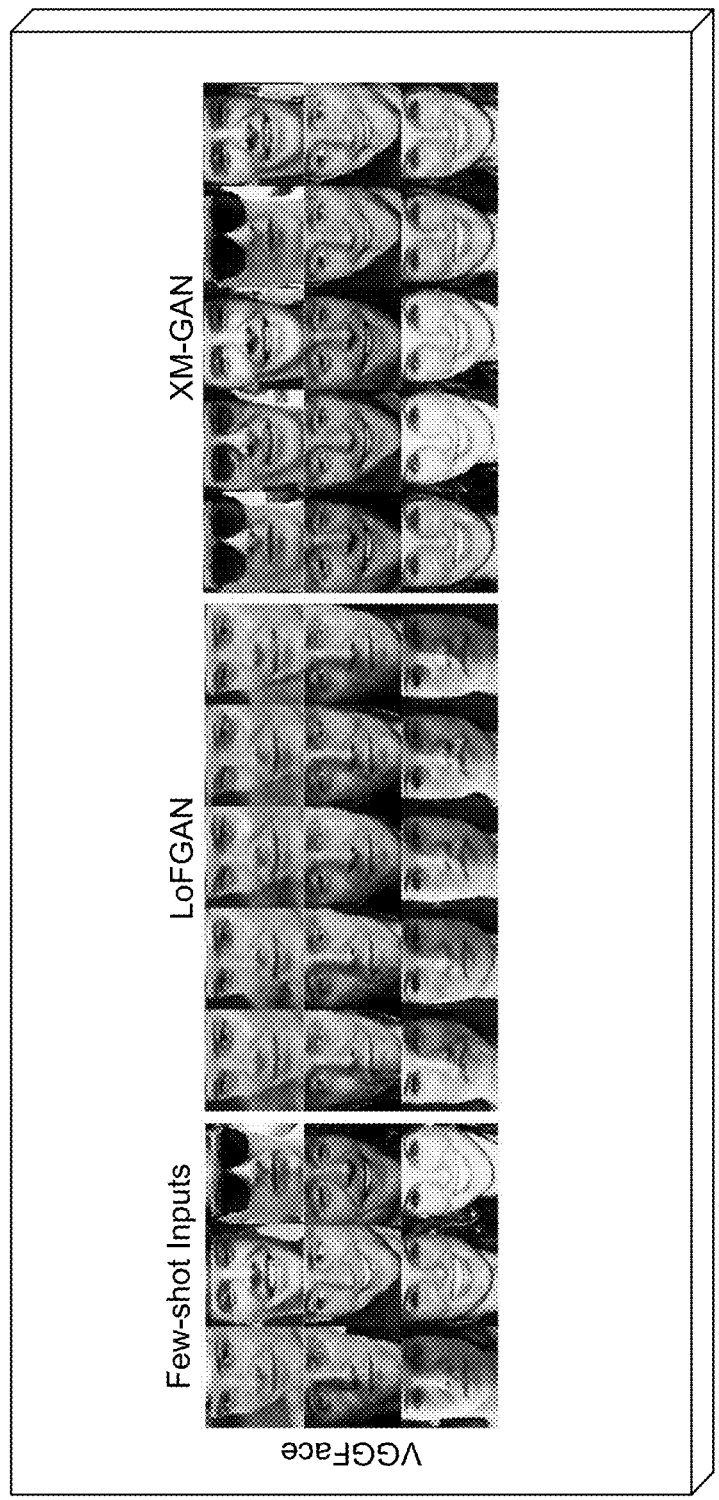
Figure 11C:
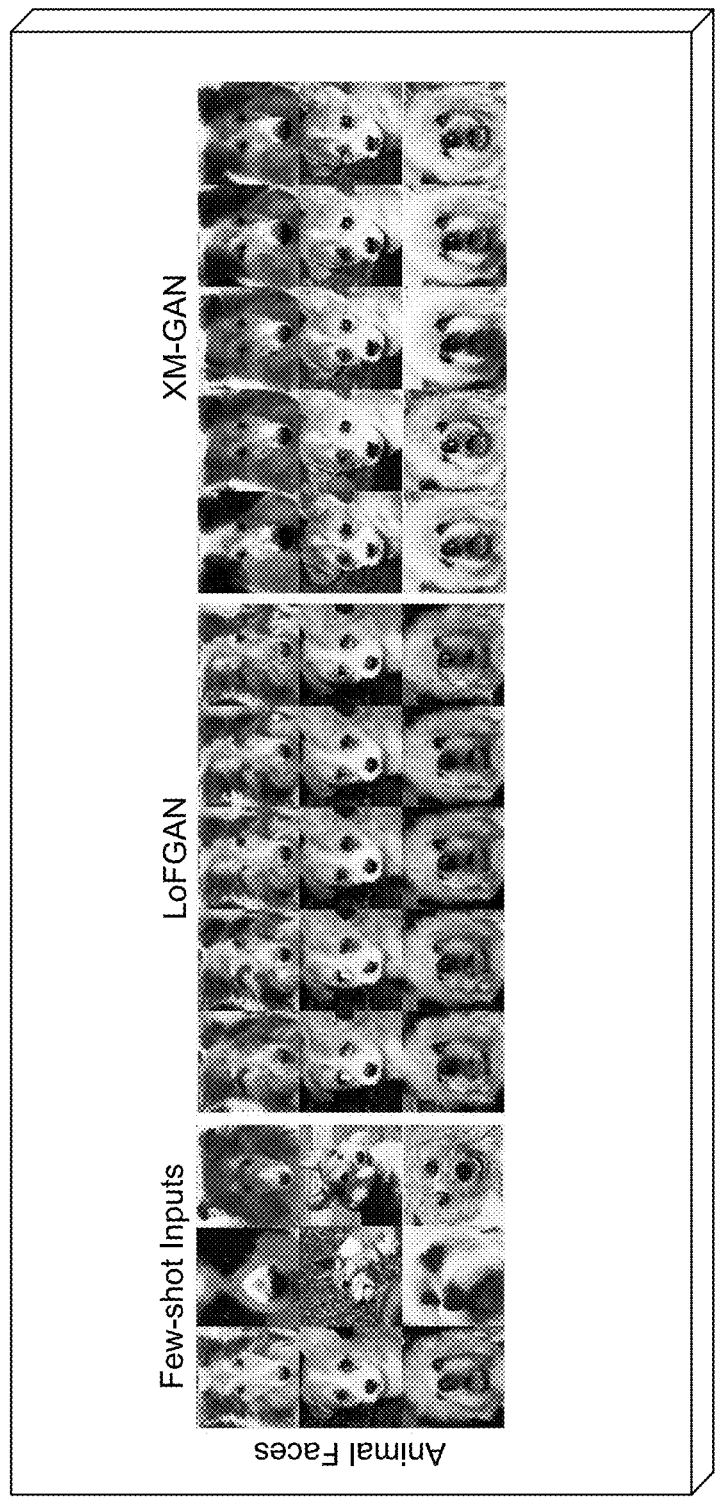

FIGS. 11A, 11B, 11C illustrate a qualitative comparison of the XM-GAN with LoFGAN on Flowers, VGGFace and Animal Faces. Example FS shows input images followed by the generated examples from LoFGAN and XM-GAN. These examples show the merits of XM-GAN towards generating high-quality and diverse images. E.g., in row 3 in Flowers, FIG. 11A, the quality of the generated images are higher compared to LoFGAN. In rows 1 and 2 of Flowers, FIG. 11A, generated images possess greater diversity in case of XM-GAN. Similarly, for VGGFace, FIG. 11B, row 3 shows higher-quality generated images in case of XM-GAN. Examples in rows 1 and 2 highlight the merits of the XM-GAN towards generating diverse images. For Animal Faces, FIG. 11C, images generated in rows 1 and 2 depict higher-quality, while images generated in row 3 possess greater diversity by XM-GAN. FIGS. 11A, 11B, 11C show the impact of varying the control parameters in the controllable feature modulation mechanism, enabling the generation of diverse images while retaining high-quality.

Human Evaluation

The human plausibility of generated images is evaluated by conducting a user study experiment, where each participant is shown two sets of generated images using the XM-GAN and LoFGAN. Each set consists of five images generated from the same K-shot examples. The participants are then asked to mark the best performing method both in terms of quality and diversity. The results show that XM-GAN performs favorably against LoFGAN both in terms of quality and diversity on all three datasets. For instance, the diversity of XM-GAN images was interpreted to be better 86% of the time over LoFGAN generated images on VGG-Face.

Numerous modifications and variations of the present invention are possible in light of the above teachings. It is therefore to be understood that within the scope of the appended claims, the invention may be practiced otherwise than as specifically described herein.

The invention claimed is:

1. An apparatus that generates a diverse set of new images from K few-shot original images, where K is a natural number, comprising:
   a graphical user interface having
      an image input for receiving the K few-shot original images, including K−1 reference images and a base image;
      a parameter input receiving a plurality of values for at least one control parameter for a fusion block, the at least one control parameter to control an extent to which each reference image impacts a newly generated image;
   processor circuitry configured with
      an image generation deep learning network for generating an image for each of the plurality of values for the at least one control parameter, the deep learning network having
         an encoder,
         a transformer-based fusion block, and
         a decoder;
      the transformer-based fusion block having
         an input for receiving the least one control parameter,
         a mapping network that computes meta-weights from features extracted from the reference images and the at least one control parameter, and
         a cross-attention block to generate modulation weights based on the meta-weights, wherein the cross-attention block includes one or more layers each including a cross-attention layer to determine a cross-attended feature, layer normalization modules that receive the meta-weights and compute output features based on modulation parameters, and a feed-forward network, in order to progressively obtain cross-attended features; and
      an output that outputs a list of the generated images based on the plurality of values for the at least one control parameter.

2. The apparatus of claim 1, wherein the graphical user interface is configured such that each of the generated images are user selectable.

3. The apparatus of claim 1, further comprising:
   a database storing stock photographs, wherein the K few-shot original images are stock photographs and the generated images are stored in the database containing stock photographs.

4. The apparatus of claim 1, wherein the parameter input for receiving the plurality of values for at least one control parameter is configured to receive an individual value, a range of values, or comma-separated values for at least one control parameter.

5. The apparatus of claim 1, wherein the cross-attention block includes a fusion component that aggregates the progressively obtained cross-attended features using the at least one control parameter to obtain a fused feature representation.

6. The apparatus of claim 5, wherein the decoder decodes the fused feature representation and generates an image for each of the plurality of values for the at least one control parameter.

7. The apparatus of claim 1, wherein the modulation weights are obtained based on sample-independent learnable weights and the meta-weights.

8. The apparatus of claim 1, wherein during training, a discriminator network, via the processor circuitry, distinguishes the generated images and real images through an adversarial loss term, an auxiliary classifier network checks that generated images belong to a desired category through a classification loss term, and a perceptual loss term utilizes the control parameters to aid the generated image to be perceptually similar to the reference images.

9. A non-transitory computer readable storage medium storing program instructions, which when executed by processor circuitry performs steps in a method of generating a diverse set of new images from K few-shot original images, where K is a natural number, the method comprising:
   receiving the K few-shot original images, including K−1 reference images and a base image;
   receiving a plurality of values for at least one control parameter for a fusion block, the at least one control parameter to control an extent to which each reference image impacts a newly generated image;
   generating, via an image generation deep learning network, an image for each of the plurality of values for the at least one control parameter, the deep learning network having
      an encoder,
      a transformer-based fusion block, and
      a decoder;
   the method further comprising:
   receiving the least one control parameter;
   computing, via a mapping network, meta-weights from features extracted from the reference images and the at least one control parameter; and
   generating, via a cross-attention block, modulation weights based on the meta-weights, wherein the cross-attention block includes one or more layers each including a cross-attention layer to determine a cross-attended feature, layer normalization modules that receive the meta-weights and compute output features based on modulation parameters, and a feed-forward network, in order to progressively obtain cross-attended features; and
   outputting a list of the generated images based on the plurality of values for the at least one control parameter.

10. The non-transitory computer readable storage medium of claim 9, further comprising:

wherein the outputting outputs each of the generated images as individual selectable images for a graphical user interface.

11. The non-transitory computer readable storage medium of claim 9, further comprising:
storing the generated images with stored stock photographs.

12. The non-transitory computer readable storage medium of claim 9, wherein the parameter input for receiving a plurality of values for at least one control parameter is configured to receive an individual value, a range of values, or comma-separated values for at least one control parameter.

13. The non-transitory computer readable storage medium of claim 9, wherein the cross-attention block includes a fusion component that aggregates the progressively obtained cross-attended features using the control parameters to obtain a fused feature representation.

14. The non-transitory computer readable storage medium of claim 13, wherein the decoder decodes the fused feature representation and generates an image for each of the plurality of values for the at least one control parameter.

15. The non-transitory computer readable storage medium of claim 9, wherein the modulation weights are obtained based on sample-independent learnable weights and the meta-weights.

16. The non-transitory computer readable storage medium of claim 9, further comprising during training, distinguishing, via a discriminator network, the generated images and real images through an adversarial loss term, an auxiliary classifier network that checks that generated images belong to a desired category through a classification loss term, and a perceptual loss term that utilizes the control parameters to aid the generated image to be perceptually similar to the reference images.

17. A method, executed by processor circuitry, of generating a diverse set of new images from K few-shot original images, where K is a natural number, the method comprising:
receiving the K few-shot original images, including K−1 reference images and a base image;
receiving a plurality of values for at least one control parameter for a fusion block, the at least one control parameter to control an extent to which each reference image impacts a newly generated image;
generating, via an image generation deep learning network, an image for each of the plurality of values for the at least one control parameter, the deep learning network having
an encoder,
a transformer-based fusion block, and
a decoder;
the method further comprising:
receiving the least one control parameter;
computing, via a mapping network, meta-weights from features extracted from the reference images and the at least one control parameter; and
generating, via a cross-attention block, modulation weights based on the meta-weights, wherein the cross-attention block includes one or more layers each including a cross-attention layer to determine a cross-attended feature, layer normalization modules that receive the meta-weights and compute output features based on modulation parameters, and a feed-forward network, in order to progressively obtain cross-attended features; and
outputting a list of the generated images based on the plurality of values for the at least one control parameter.

18. The method of claim 17, further comprising:
displaying the list of the generated images in association with respective said plurality of values for the at least one control parameter.

* * * * *